United States Patent
Takeuchi et al.

(10) Patent No.: US 12,523,916 B2
(45) Date of Patent: Jan. 13, 2026

(54) QUANTUM ABSORPTION SPECTROSCOPY SYSTEM

(71) Applicant: Kyoto University, Kyoto (JP)

(72) Inventors: Shigeki Takeuchi, Kyoto (JP); Hideaki Takashima, Kyoto (JP); Yu Mukai, Kyoto (JP)

(73) Assignee: Kyoto University, Kyoto (JP)

( * ) Notice: Subject to any disclaimer, the term of this patent is extended or adjusted under 35 U.S.C. 154(b) by 110 days.

(21) Appl. No.: 18/548,393

(22) PCT Filed: Mar. 4, 2022

(86) PCT No.: PCT/JP2022/009439
§ 371 (c)(1),
(2) Date: Aug. 30, 2023

(87) PCT Pub. No.: WO2022/186383
PCT Pub. Date: Sep. 9, 2022

(65) Prior Publication Data
US 2024/0152026 A1    May 9, 2024

(30) Foreign Application Priority Data
Mar. 5, 2021  (JP) .................................. 2021-035699

(51) Int. Cl.
*G02F 1/39* (2006.01)
*G01J 3/02* (2006.01)
(Continued)

(52) U.S. Cl.
CPC ............ *G02F 1/395* (2013.01); *G01J 3/0218* (2013.01); *G01J 3/10* (2013.01); *G01J 3/453* (2013.01)

(58) Field of Classification Search
CPC ..................................... G01J 3/45; G02F 1/39
See application file for complete search history.

(56) References Cited

U.S. PATENT DOCUMENTS

| 10,564,363 | B1* | 2/2020 | Corl ......................... G02B 6/262 |
| 11,448,938 | B2* | 9/2022 | Cushing ................. G01N 21/31 |

(Continued)

FOREIGN PATENT DOCUMENTS

| CN | 209182627 U | * | 7/2019 |
| CN | 113376927 A | | 9/2021 |

(Continued)

OTHER PUBLICATIONS

Lindner, C., Kunz, J., Herr, S.J., Wolf, S., Kießling, J. and Kuhnemann, F., 2021. Nonlinear interferometer for Fourier-transform mid-infrared gas spectroscopy using near-infrared detection. Optics Express, 29(3), pp. 4035-4047 (Year: 2021).*

(Continued)

*Primary Examiner* — Uzma Alam
*Assistant Examiner* — Mohamed Doumbia
(74) *Attorney, Agent, or Firm* — Knobbe, Martens, Olson & Bear, LLP

(57) ABSTRACT

A quantum absorption spectroscopy system (1) includes a pump light source (11), a quantum interferometer (21), and a spectroscope (31). The pump light source (11) emits pump light. The quantum interferometer (21) causes quantum interference between a plurality of physical processes in which a quantum entanglement photon pair of a signal photon and an idler photon is generated through spontaneous parametric down-conversion of the pump light, a sample being arranged on a propagation path of the idler photon. The spectroscope (31) detects a signal photon from the quantum interferometer (21). The quantum interferometer (21) includes a single mode fiber (SMF) portion optically coupled to at least part of a propagation path of the signal photon and the propagation path of the idler photon.

14 Claims, 25 Drawing Sheets

(51) Int. Cl.
  *G01J 3/10* (2006.01)
  *G01J 3/453* (2006.01)

(56) References Cited

U.S. PATENT DOCUMENTS

2005/0094142 A1   5/2005   Takeuchi
2023/0020945 A1   1/2023   Takeuchi et al.

FOREIGN PATENT DOCUMENTS

| JP | S6371624 A | * | 4/1988 |
| JP | 2003-228091 A | | 8/2003 |
| JP | 2005-527838 A | | 9/2005 |
| WO | WO 03/106942 A1 | | 12/2003 |
| WO | WO 2021/117632 A1 | | 6/2021 |
| WO | WO 2021/215479 A1 | | 10/2021 |
| WO | WO 2022/186383 A1 | | 9/2022 |

OTHER PUBLICATIONS

Kurtsiefer, C., Oberparleiter, M. and Weinfurter, H., 2001. High-efficiency entangled photon pair collection in type-II parametric fluorescence. Physical Review A, 64(2), p. 023802 (Year: 2001).*

Garcia-Fernandez, R., Alt, W., Bruse, F., Dan, C., Karapetyan, K., Rehband, O., Stiebeiner, A., Wiedemann, U., Meschede, D. and Rauschenbeutel, A., 2011. Optical nanofibers and spectroscopy. Applied Physics B, 105, pp. 3-15 (Year: 2011).*

Arahata, Masaya et al., "Demonstration of tunable broadband infrared quantum absorption spectroscopy in the mid-infrared region 2-5 μm," Proceedings of the 82nd JSAP Autumn Meeting, Japan Society of Applied Physics 03-272, 12p-N103-10, Aug. 26, 2021.

Hojo, Masayuki, et al. "Quantitative estimation of simultaneous parametric down-conversion," Proceedings of the 82nd JSAP Autumn Meeting, Japan Society of Applied Physics 03-213, 12a-N103-3, Aug. 26, 2021.

International Search Report and Written Opinion received in PCT Application No. PCT/JP2022/009439 as mailed Apr. 26, 2022 in 8 pages.

Lindner, Chiara, et al. "Accurate, high-resolution dispersive Fourier-transform spectroscopy with undetected photons." Optics Continuum 1.2 (2022): 189-196.

Lindner, Chiara, et al. "Nonlinear interferometer for Fourier-transform mid-infrared gas spectroscopy using near-infrared detection." Optics Express 29.3 (2021): 4035-4047.

Mukai, Y., et al. "Quantum Fourier-transform infrared spectroscopy for complex transmittance measurements." Physical Review Applied 15.3 (2021): 034019.

Okamoto, Ryo, et al. "Optical phase measurement beating standard quantum limit using entangled photons." Proceedings of the IEICE Electronics Society Conference (1), BCI-2-3, Sep. 9, 2014.

Okano, Masayuki, et al. "0.54 μm resolution two-photon interference with dispersion cancellation for quantum optical coherence tomography." Scientific reports 5.1 (2015): 18042.

Paterova, Anna, et al. "Measurement of infrared optical constants with visible photons." New Journal of Physics 20.4 (2018): 043015.

* cited by examiner

FIG.2
《WITHOUT SAMPLE》
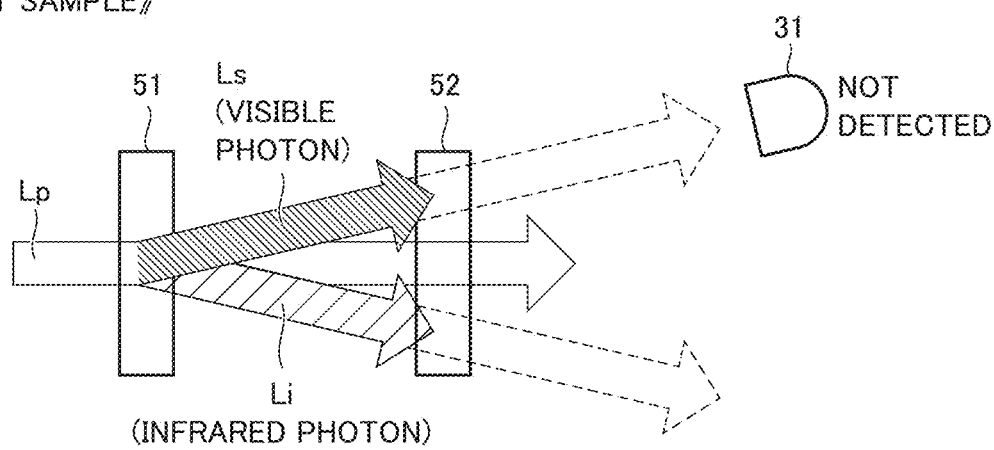
《WITH SAMPLE》
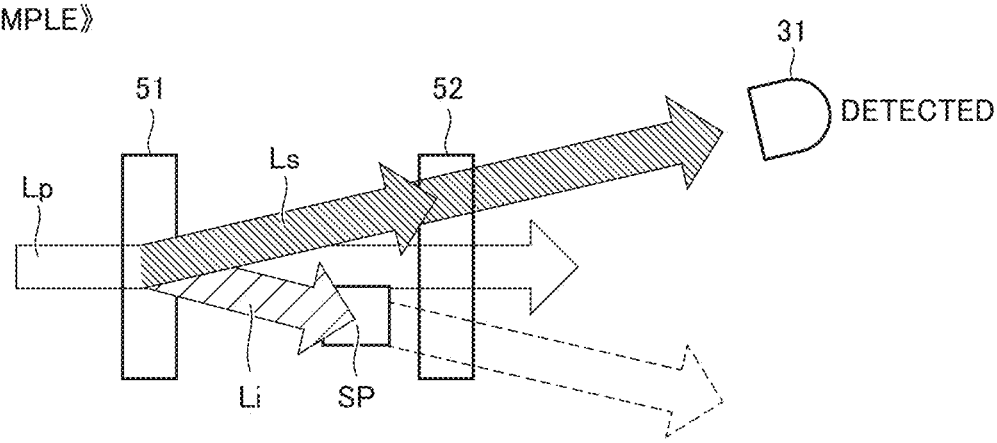

FIG.6

| DIAMETER $\phi$ [$\mu$m] | SINGLE MODE PROPAGATION WAVELENGTH [$\mu$m] | FEW MODE PROPAGATION WAVELENGTH [$\mu$m] |
|---|---|---|
| 0.5 | 1.5~2.7 | ABOUT 1.2~1.5 |
| 1 | 3.0~5.0 | ABOUT 2.5~3.0 |
| 1.5 | 4.5~7.0 | ABOUT 3.5~4.5 |
| 2 | 6.0~9.1 | ABOUT 5.0~6.0 |
| 2.5 | 7.5~10.9 | ABOUT 6.0~7.5 |
| 3 | 8.7~12.7 | ABOUT 8.0~8.7 |
| 3.5 | 10.8~14.9 | ABOUT 10.0~10.8 |
| 4 | 12.3~16.5 | ABOUT 11.0~12.3 |
| 4.5 | 13.6~18.2 | ABOUT 12.0~13.6 |
| 5 | 15.3~19.8 | ABOUT 13.0~15.3 |

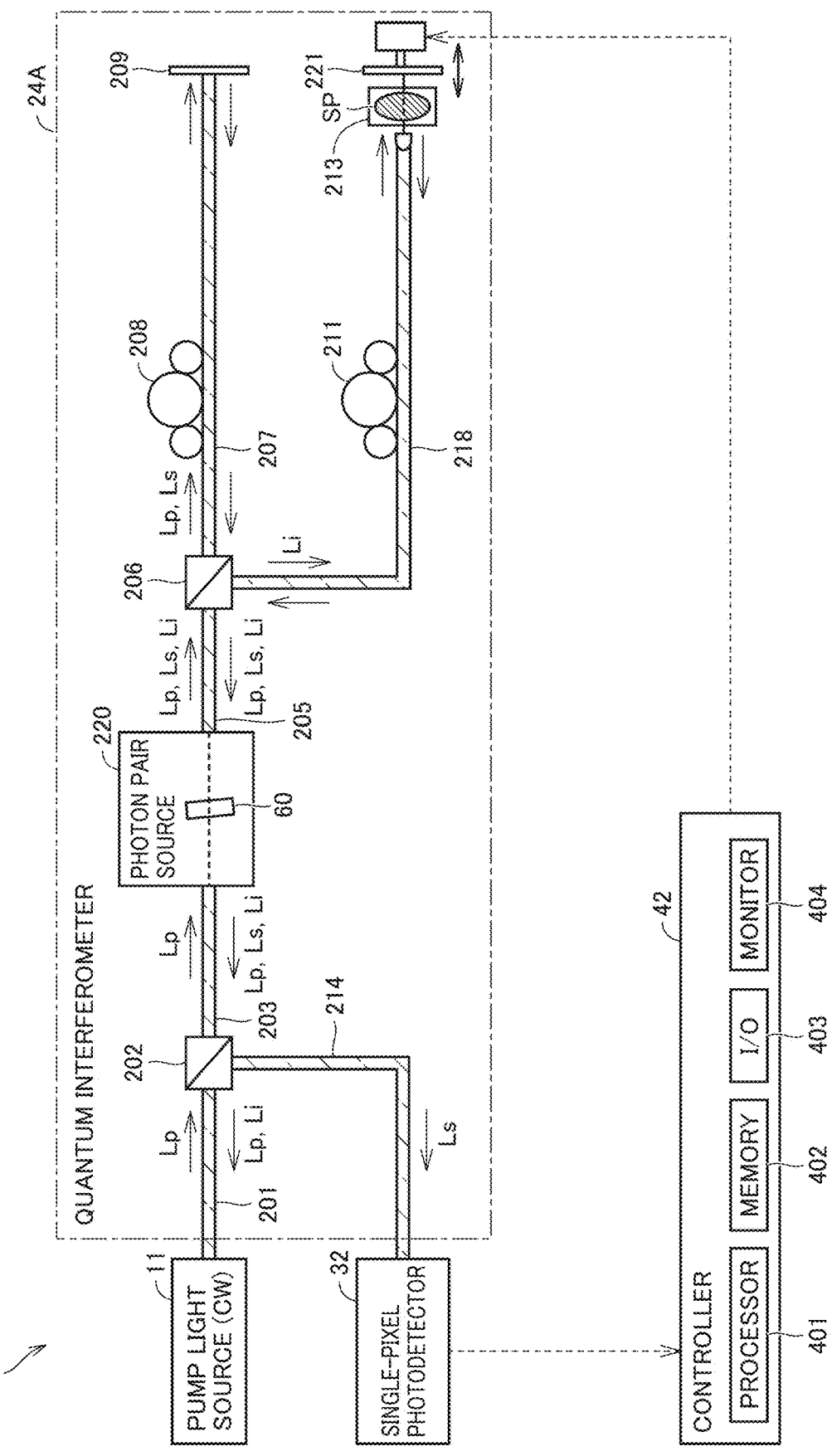

QUANTUM ABSORPTION SPECTROSCOPY SYSTEM

CROSS-REFERENCE TO RELATED APPLICATIONS

This application is the U.S. National Phase under 35 U.S.C. § 371 of International Application No. PCT/JP2022/009439, filed Mar. 4, 2022, designating the United States and published in Japanese on Sep. 9, 2022 as International Publication No. WO2022/186383, which claims priority to Japanese Application No. 2021-035699, filed Mar. 5, 2021, which is incorporated herein by reference in its entirety.

TECHNICAL FIELD

The present disclosure relates to a quantum absorption spectroscopy system.

BACKGROUND ART

Generally, in an infrared absorption spectroscopy method, a sample is irradiated with infrared light. A change in intensity of infrared light associated with absorption by the sample is acquired as an infrared absorption spectrum of the sample. In particular, Fourier transform infrared spectroscopy (FTIR) among infrared absorption spectroscopy methods is widely used to specify a molecular structure (such as the type of functional group or a three-dimensional structure) in fields such as chemistry, biology, or pharmacy.

Further, in recent years, in the fields of quantum technology such as quantum metrology, quantum communication, and quantum computing, achieving a new function using a "quantum entangled" photon pair in which two photons have a quantum mechanical correlation has been endeavored. Hereinafter, such a photon pair is referred to as a "quantum entangled photon pair".

CITATION LIST

Patent Literature

PTL 1: Japanese Patent Laying-Open No. 2003-228091
PTL 2: Japanese National Patent Publication No. 2005-527838

Non Patent Literature

NPL 1: Anna Paterova, Hongzhi Yang, Chengwu An, Dmitry Kalashnikov and Leonid Krivitsky, "Measurement of infrared optical constants with visible photons", New Journal of Physics 20(2018)043015
NPL 2: Masayuki Okano, Hwan Hong Lim, Ryo Okamoto, Norihiko Nishizawa, Sunao Kurimura and Shigeki Takeuchi, "0.54 µm resolution two-photon interference with dispersion cancellation for quantum optical coherence tomography", Scientific Reports volume 5, Article number: 18042 (2015)

SUMMARY OF INVENTION

Technical Problem

The present inventors have advanced research of a "quantum absorption spectroscopy system" which is an absorption spectroscopy system using the quantum entanglement photon pair. There is a demand for a technology for improving measurement sensitivity of the quantum absorption spectroscopy system.

The present disclosure has been made to solve such a problem, and an object of the present disclosure is to improve measurement sensitivity of the quantum absorption spectroscopy system.

Solution to Problem (1) A quantum absorption spectroscopy system according to an aspect of the present disclosure includes a pump light source, a quantum interferometer, and a photodetector. The pump light source emits pump light. The quantum interferometer causes quantum interference between a plurality of physical processes in which a quantum entanglement photon pair of a signal photon and an idler photon is generated through spontaneous parametric down-conversion of the pump light, a sample being arranged on a propagation path of the idler photon. The photodetector detects the signal photon from the quantum interferometer. The quantum interferometer includes a single mode fiber portion optically coupled to at least part of a propagation path of the signal photon and the propagation path of the idler photon.

(2) The quantum interferometer further includes a wavelength separation element that separates the quantum entanglement photon pair into the signal photon and the idler photon in accordance with a wavelength. The single mode fiber portion includes a first single mode fiber that is optically coupled to the wavelength separation element and propagates light in a wavelength range of the idler photon. The first single mode fiber is a tapered fiber.

(3) The tapered fiber has a non-tapered portion, and a taper waist portion thinner than the non-tapered portion. The taper waist portion has a diameter included in a wavelength range from a visible range to a far-infrared range.

(4) The tapered fiber is replaceable.

(5) The quantum interferometer further includes a first mirror that reflects the idler photon, and a second mirror that reflects the signal photon. The first single mode fiber is optically coupled between the wavelength separation element and the first mirror. The single mode fiber portion further includes a second single mode fiber that is optically coupled between the wavelength separation element and the second mirror and propagates light in a wavelength range of the signal photon. At least one of the first and second single mode fibers is a polarization maintaining fiber.

(6) The quantum interferometer further includes a photon pair source that generates the quantum entanglement photon pair. The single mode fiber portion further includes a wideband single mode fiber that is optically coupled between the photon pair source and the wavelength separation element and propagates light in all wavelength ranges of the pump light, the signal photon, and the idler photon.

(7) The quantum interferometer further includes a photon pair source that generates the quantum entanglement photon pair, and a wavelength separation element that separates the quantum entanglement photon pair into the signal photon and the idler photon in accordance with a wavelength. The single mode fiber portion includes a wideband single mode fiber that is optically coupled between the photon pair source and the wavelength separation element and propagates light in all wavelength ranges of the pump light, the signal photon, and the idler photon.

(8) The wideband single mode fiber is a photonic crystal fiber.

(9) The pump light source is a pulsed light source. The photodetector is a single-pixel photodetector. The single mode fiber portion includes a wavelength dispersion single mode fiber optically coupled to the single-pixel photodetector.

(10) The quantum interferometer is used in a high gain region in which a signal intensity of the single-pixel photodetector increases non-linearly as transmittance of the idler photon for the sample rises. The single mode fiber portion further includes an absorber that absorbs the idler photon.

(11) The quantum absorption spectroscopy system further includes a processor that executes arithmetic processing for analyzing an absorption spectroscopy characteristic of the sample. The quantum interferometer further includes a phase converter that changes a phase of one of the signal photon and the idler photon. The photodetector outputs a quantum interference signal in accordance with the number of the signal photons detected in a case where the phase of the one of the signal photon and the idler photon is changed by the phase converter. The processor calculates the absorption spectroscopy characteristic of the sample by Fourier transform on the quantum interference signal.

(12) The processor calculates a Fourier spectrum by Fourier transform on the quantum interference signal in a state where the sample is arranged on the propagation path of the idler photon, and further calculates a reference Fourier spectrum by Fourier transform on the quantum interference signal in a state where the sample is not arranged on the propagation path of the idler photon. The processor calculates a complex transmittance spectrum of the sample based on a ratio between the Fourier spectrum and the reference Fourier spectrum.

(13) The processor calculates an absorption spectrum of the sample by squaring an absolute value of the complex transmittance spectrum of the sample.

(14) The quantum interferometer generates a visible photon as the signal photon. The photodetector is a silicon-based photodetector.

Advantageous Effect of Invention

The present disclosure enables measurement sensitivity of the quantum absorption spectroscopy system to be improved.

BRIEF DESCRIPTION OF DRAWINGS

FIG. 2 is a conceptual diagram for describing the principle of quantum absorption spectroscopy.

FIG. 6 is a diagram showing a summarized relationship between diameter of the taper waist portion and wavelength range of idler light.

FIG. 25 is a diagram schematically showing the overall configuration of a quantum absorption spectroscopy system according to a modification of the fourth embodiment.

DESCRIPTION OF EMBODIMENTS

Figure 1:
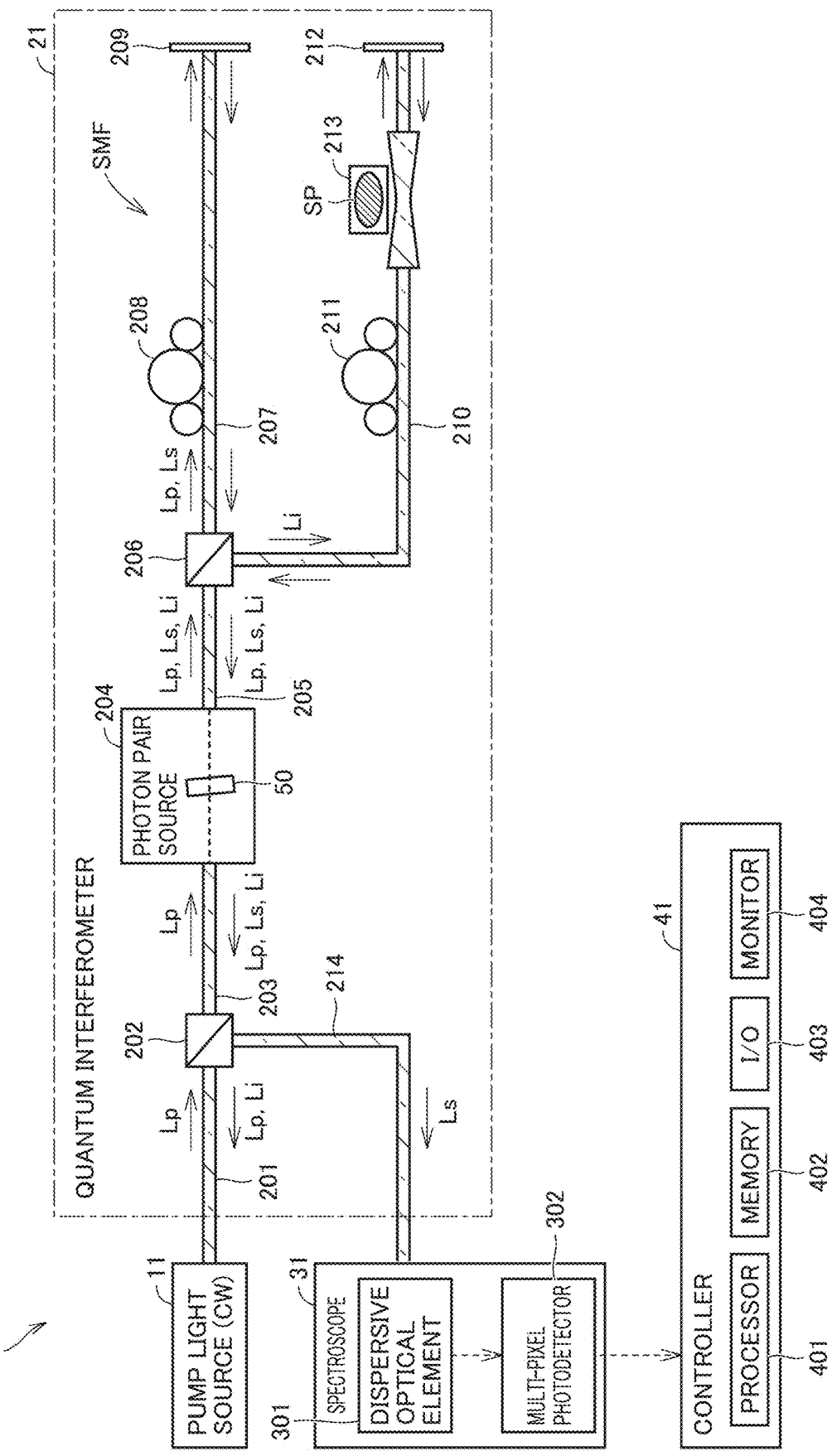
FIG. 1 is a diagram schematically showing the overall configuration of a quantum absorption spectroscopy system according to a first embodiment.

In the present disclosure and embodiments thereof, an ultraviolet range means a wavelength range of 10 nm to 360 nm. A visible range means a wavelength range of 360 nm to 1050 nm. A near-infrared range means a wavelength range of 1050 nm to 2 μm. A mid-infrared range means a wavelength range of 2 μm to 5 μm. A far-infrared range means a wavelength range of 5 μm to 20 μm. An ultra-far infrared range (terahertz range) means a wavelength range of 20 μm to 1 mm. An infrared range may include all of the near-infrared range, the mid-infrared range, the far-infrared range, and the ultra-far-infrared range.

In the present disclosure and the embodiments thereof, a nanometer order includes a range from 1 nm to 1000 nm (=1 µm). A sub-micrometer order includes a range from 100 nm to 1 µm. A micrometer order includes a range from 1 µm to 1000 µm (=1 mm). A millimeter order includes a range from 1 mm to 100 mm (=10 cm).

Hereinafter, the embodiments of the present disclosure will be described in detail with reference to the drawings. The same or corresponding parts in the drawings are denoted by the same reference numerals, and the description thereof will not be repeated. In each of the embodiments, a configuration for measuring absorption spectroscopy characteristics of a sample in a near-infrared range using a quantum absorption spectroscopy system according to the present disclosure will be described. However, a wavelength range that can be measured using the quantum absorption spectroscopy system according to the present disclosure is not limited to the near-infrared range. The quantum absorption spectroscopy system according to the present disclosure can also measure the absorption spectroscopy characteristics of the sample in the ultraviolet range, the visible range, the mid-infrared range, the far-infrared range, or the ultra-far infrared range.

First Embodiment

<System Overall Configuration>

FIG. 1 is a diagram schematically showing the overall configuration of a quantum absorption spectroscopy system according to a first embodiment. A quantum absorption spectroscopy system 1 includes a pump light source 11, a quantum interferometer 21, a spectroscope 31, and a controller 41.

Pump light source 11 emits pump light for pumping a nonlinear optical crystal 50 (which will be described later). In the diagram, the pump light is indicated by Lp. Hereinafter, a propagation path of the pump light is also described as a "pumping optical path". In the first embodiment, pump light source 11 emits continuous wave (CW) laser light included in the visible range. Specifically, a semiconductor laser that emits green laser light having a wavelength of 532 nm, for example, can be employed as pump light source 11. A pulse laser may be used as will be described later.

Quantum interferometer 21 is configured to cause quantum interference between a plurality of physical processes in which a quantum entanglement photon pair of a signal photon and an idler photon is generated by irradiation with pump light. As will be described later in detail in FIG. 2, attention should be paid to the quantum interference because the quantum interference is different from normal light interference. In the diagram, a propagation path of a signal photon is indicated by Ls, and a propagation path of an idler photon is indicated by Li. Hereinafter, the propagation path of the signal photon may be abbreviated as a "signal optical path", and the propagation path of the idler photon may be abbreviated as an "idler optical path".

Quantum interferometer 21 is an optical system to which a configuration similar to that of a Michelson interferometer, for example, is applied. In the present embodiment, respective optical elements of quantum interferometer 21 are optically coupled with optical fibers. Quantum interferometer 21 includes an optical fiber 201, a dichroic splitter 202, an optical fiber 203, a photon pair source 204, an optical fiber 205, a dichroic splitter 206, an optical fiber 207, a polarization controller 208, a mirror 209, an optical fiber 210, a polarization controller 211, a mirror 212, a sample holder 213, and an optical fiber 214.

Optical fiber 201 optically couples pump light source 11 and dichroic splitter 202. Optical fiber 201 is a single mode fiber (SMF) that propagates light in a wavelength range of the pump light (in this example, visible light) in a single mode.

Dichroic splitter 202 is arranged between pump light source 11 and photon pair source 204. Dichroic splitter 202 reflects light in a wavelength range of signal light, and transmits light outside the above-described wavelength range (light in wavelength ranges of the pump light and the idler light). The dichroic splitter is also called a wavelength separation coupler. A half mirror may be used instead of dichroic splitter 202. The same applies to dichroic splitter 206.

Optical fiber 203 optically couples dichroic splitter 202 and photon pair source 204. Optical fiber 203 is a single mode fiber that propagates light in the wavelength range of the pump light and light in the wavelength range of the signal light (both of which are visible light in this example) in the single mode.

Photon pair source 204 includes nonlinear optical crystal 50, and generates the quantum entanglement photon pair of the signal light and the idler light from the pump light. More particularly, nonlinear optical crystal 50 generates the quantum entanglement photon pair through spontaneous parametric down-conversion (SPDC) of the pump light. Nonlinear optical crystal 50 is, for example, a lithium niobate ($LiNbO_3$) crystal. In this case, the signal light is visible light and the idler light is infrared light (near-infrared light or mid-infrared light).

However, the type of nonlinear optical crystal 50 is not particularly limited. Another type of nonlinear optical crystal such as a gallium silver sulfide ($AgGaS_2$) crystal can also be employed. The principle of the quantum absorption spectroscopy using nonlinear optical crystal 50 will be described in FIG. 2.

Note that in the present specification, when a compound is expressed by a stoichiometric composition formula, the stoichiometric composition formula is merely a representative example. A composition ratio may be non-stoichiometric. For example, when lithium niobate is expressed as "$LiNbO_3$", lithium niobate is not limited to the composition ratio of "Li/Nb/O=1/1/3" and may contain Li, Nb, and O in any composition ratio unless otherwise specified. The same applies to other compounds.

Nonlinear optical crystal 50 is an example of a nonlinear optical element for generating the quantum entanglement photon pair through SPDC. Instead of nonlinear optical crystal 50, four-wave mixing in a ring resonator, a nonlinear fiber, or an optical waveguide formed of silicon (Si) and/or silicon nitride (SiN) or the like (neither shown) may be employed as means for generating the quantum entanglement photon pair.

Optical fiber 205 optically couples photon pair source 204 and dichroic splitter 206. Optical fiber 203 is a wideband single mode fiber that propagates all of light in the wavelength range of the pump light, light in the wavelength range of the signal light, and light in the wavelength range of the idler light (visible light, near-infrared light, and mid-infrared light) in the single mode. Therefore, optical fiber 205 is also hereinafter described as a "wideband SMF 205". A configuration of wideband SMF 205 will be described in FIG. 3.

Dichroic splitter 206 is arranged between photon pair source 204 and mirror 209; and between photon pair source 204 and mirror 212. Dichroic splitter 206 transmits light in the wavelength range of the pump light and light in the wavelength range of the signal light, and reflects light outside the above-described wavelength ranges (light in the wavelength range of the idler light). Note that dichroic splitter 206 is an example of a "wavelength separation element" according to the present disclosure.

Optical fiber 207 optically couples dichroic splitter 206 and mirror 209. Optical fiber 207 is a single mode fiber that propagates light in the wavelength range of the pump light and light in the wavelength range of the signal light (both of which are visible light) in the single mode. Therefore, optical fiber 207 is also hereinafter described as "visible SMF 207". Note that visible SMF 207 is an example of a "second single mode fiber" according to the present disclosure.

Polarization controller 208 is optically coupled to visible SMF 207. When a stress is externally applied to visible SMF 207, polarization controller 208 converts a polarization state of the signal light propagating through visible SMF 207 into any polarization state. In the example shown in FIG. 1, polarization controller 208 is of a paddle type, and has three paddles (circular portions). Each paddle functions as a quasi-wavelength plate (such as a quarter wavelength plate or half-wavelength plate). By adjusting the angles of the three paddles, the polarization state of the signal light can be changed. However, polarization controller 208 may be of a bulk type or an in-line type.

Mirror 209 reflects the pump light and the signal light. The pump light and the signal light reflected by mirror 209 propagate through visible SMF 207 to reach dichroic splitter 206. Then, reflected light of the pump light and reflected light of the signal light are transmitted through dichroic splitter 206 again to return to photon pair source 204 (nonlinear optical crystal 50). Note that mirror 209 is equivalent to a "second mirror" according to the present disclosure.

Optical fiber 210 optically couples dichroic splitter 206 and mirror 212. Optical fiber 210 is a single mode fiber that propagates light in the wavelength range of the idler light (infrared light) in the single mode. Therefore, optical fiber 210 is also hereinafter described as "infrared SMF 210".

In the present embodiment, infrared SMF 210 is a tapered fiber obtained by heating and stretching a single mode fiber to partially reduce the diameter thereof. A configuration of infrared SMF 210 will be described in FIG. 4. Note that infrared SMF 210 is an example of a "first single mode fiber" according to the present disclosure.

Polarization controller 211 is optically coupled to infrared SMF 210. Polarization controller 211 converts a polarization state of the idler light propagating through infrared SMF 210 into any polarization state similarly to polarization controller 208.

Mirror 212 reflects the idler light. The idler light reflected by mirror 212 propagates through infrared SMF 210 to reach dichroic splitter 206. Then, reflected light of the idler light is reflected by dichroic splitter 206 again to return to photon pair source 204. Note that mirror 212 is equivalent to a "first mirror" according to the present disclosure. The "first mirror" and the "second mirror" according to the present disclosure may be reflection Bragg gratings.

Sample holder 213 is arranged between dichroic splitter 206 and mirror 212. Sample holder 213 holds a sample (indicated by SP in the diagram).

Optical fiber 214 optically couples dichroic splitter 202 and spectroscope 31. Optical fiber 214 is a single mode fiber that propagates light in the wavelength range of the signal light (visible light) in the single mode. Among the pump light, the signal light, and the idler light on the return path reflected by mirrors 209 and 212 to return to photon pair source 204, the signal light is reflected by dichroic splitter 202 and propagates through optical fiber 214 to reach spectroscope 31. On the other hand, the pump light and the idler light are transmitted through dichroic splitter 202, thus not reaching spectroscope 31.

Spectroscope 31 spectrally disperses the signal light having reached spectroscope 31. Spectroscope 31 includes a dispersive optical element 301 and a multi-pixel photodetector 302. Dispersive optical element 301 is typically a diffraction grating or a prism, and disperses signal light in different directions in accordance with a wavelength.

Multi-pixel photodetector 302 includes a plurality of pixels (light receiving elements) laid out in an array. Multi-pixel photodetector 302 is a silicon-based photodetector and has optical characteristics capable of detecting visible light. Specifically, multi-pixel photodetector 302 is a charged-coupled device (CCD) image sensor, a complementary metal-oxide-semiconductor (CMOS) image sensor, or the like. Multi-pixel photodetector 302 detects the signal light in accordance with control exerted by controller 41 and outputs a detection signal thereof to controller 41. The intensity of the detection signal of the signal light is an intensity in accordance with the number of signal photons detected by multi-pixel photodetector 302 (more particularly, an intensity directly proportional to the number of signal photons detected).

Controller 41 includes a processor 401 such as a central processing unit (CPU), a memory 402 such as a read only memory (ROM) and a random access memory (RAM), an input/output port 403, and a monitor 404. Controller 41 controls devices (pump light source 11 and spectroscope 31) constituting quantum absorption spectroscopy system 1. Controller 41 also executes arithmetic processing for analyzing infrared absorption spectroscopy characteristics (such as the infrared absorption spectrum and the refractive index) of a sample based on the detection signal of the signal light from multi-pixel photodetector 302. Results of the arithmetic processing performed by controller 41 are displayed on monitor 404. Thus, an operator can confirm the infrared absorption spectroscopy characteristics of the sample.

In quantum interferometer 21 shown in FIG. 1, a quantum interferometer similar to a Michelson interferometer is employed. However, the quantum absorption spectroscopy system according to the present disclosure may include a quantum interferometer configured similarly to a Mach-Zehnder interferometer including a plurality of nonlinear optical elements.

In the first embodiment, optical fiber 203, wideband SMF 205, visible SMF 207, infrared SMF 210, and optical fiber 214 are equivalent to a "single mode fiber portion" (indicated with a reference character SMF) according to the present disclosure.

<Measurement Principle>

FIG. 2 is a conceptual diagram for describing the principle of quantum absorption spectroscopy. It has been described in FIG. 1 that only one nonlinear optical crystal 50 is arranged on the pumping optical path, and the pump light passes through nonlinear optical crystal 50 twice, to and fro. In FIG. 2, in order to facilitate understanding of the measurement principle, a configuration in which two nonlinear optical crystals are arranged on the pumping optical path will be described as an example. The two nonlinear optical crystals are described as a first crystal 51 and a second crystal 52.

When first crystal 51 is irradiated with the pump light from pump light source 11, one photon having relatively large energy is divided into two photons having smaller energy through the SPDC in first crystal 51 while satisfying the energy conservation law. In the example shown in FIG. 2, from one visible photon (pump photon), a quantum entangled photon pair of one visible photon (signal photon) and one infrared photon (idler photon) is generated. Irradiation of second crystal 52 with the pump light similarly generates a quantum entangled photon pair of one visible photon and one infrared photon. Spectroscope 31 is arranged on the propagation path of the visible photon.

Quantum interference occurs between an event in which a quantum entangled photon pair is generated by first crystal 51 (hereinafter, referred to as a "first physical process") and an event in which a quantum entangled photon pair is generated by second crystal 52 (hereinafter, referred to as a "second physical process"). More particularly, when a probability amplitude representing the first physical process and a probability amplitude representing the second physical process are added, the first physical process and the second physical process intensify each other if the two probability amplitudes are in the same phase, whereas the first physical process and the second physical process cancel each other if the two probability amplitudes are in opposite phases (quantum interference effect). Hereinafter, interference (destructive interference) in which the first physical process and the second physical process cancel each other will be described as an example.

When a sample that is an infrared absorber is not arranged on the idler optical path, the first physical process and the second physical process are indistinguishable from each other, and the first physical process and the second physical process cause quantum interference (cancel each other in this example). In this case, it is observed that a quantum entangled photon pair is not generated at a stage subsequent to second crystal 52. That is, the signal photon is not detected by spectroscope 31.

In contrast, when the sample is arranged on the idler optical path, the idler photon is absorbed by the sample. Then, the first physical process and the second physical process are distinguishable from each other, so that quantum interference between the first physical process and the second physical process becomes incomplete. As a result, the signal photon is detected by spectroscope 31.

As described above, in the quantum absorption spectroscopy, one signal photon (visible photon) of the quantum entanglement photon pair is detected by spectroscope 31, which makes it possible to determine that the other idler photon (infrared photon) has been absorbed by the sample.

Note that in the conceptual diagram shown in FIG. 2, an example in which quantum interferometer 21 causes the quantum interference between the two physical processes (the first and second physical processes) has been described. However, the quantum interferometer according to the present disclosure may cause quantum interference among three or more physical processes. That is, the quantum interferometer may cause quantum interference between at least two physical processes. The quantum interferometer may cause interference (constructive interference) in which the first physical process and the second physical process intensify each other.

<Application of SMF to Quantum Absorption Spectroscopy Method>

A classical infrared absorption spectroscopy system such as a commercially available FTIR system includes a thermal light source (a heating element such as a SiC heater) for generating infrared light. Such a thermal light source has a finite size of approximately several millimeters to several centimeters, and emits light in every direction. Since light is radiated from the thermal light source in many spatial modes in respective independent phases, the thermal light source cannot be coupled to a single mode fiber with high efficiency in principle.

In quantum absorption spectroscopy system 1 according to the present embodiment, photon pair source 204 generates a quantum entanglement photon pair through spontaneous parametric down-conversion (SPDC). SPDC exhibits mode selectivity. In other words, in SPDC, a quantum entanglement photon pair can be generated in a specific spatial mode (single spatial mode) that satisfies a phase matching condition. A quantum entanglement photon pair present in the single spatial mode can be coupled to the single mode fiber with high efficiency. As described above, the quantum absorption spectroscopy method has compatibility with a device configuration through use of single mode fibers higher than the classic absorption spectroscopy method through use of a thermal light source having a finite size. However, a measurement example of infrared quantum absorption spectroscopy through use of single mode fibers has not been reported so far.

The present disclosure is based on the fact that the present inventors focusing on the high compatibility between the quantum absorption spectroscopy method and single mode fibers have found out that configuring propagation paths and the like of a quantum entanglement photon pair by single mode fibers brings various advantages in socially implementing the quantum absorption spectroscopy system. First, measurement sensitivity of the quantum absorption spectroscopy method is proportionate to visibility of quantum interference. Since the use of single mode fibers causes quantum interference due to quantum entanglement light present in the single spatial mode to selectively occur, high visibility of quantum interference is achieved. Therefore, the measurement sensitivity of quantum absorption spectroscopy system 1 can be improved. Second, as will be described below, quantum absorption spectroscopy system 1 can be made robust and downsized by using single mode fibers.

An aspect in which all optical elements are arranged in free space without using a single mode fiber is herein called a "spatial-type". In a spatial-type system configuration, screws fixing optical elements may be loosened by physical vibrations to cause optical path offset. Optical path offset may also be caused by a temperature change in the environment (thermal fluctuation). In addition, in the spatial-type system configuration, the quantum absorption spectroscopy system excluding a controller has a certain level of size (such as the size of a rectangular parallelepiped with each side being several tens of centimeters).

In contrast, in quantum interferometer 21 of quantum absorption spectroscopy system 1, all optical elements are optically coupled with single mode fibers. Therefore, optical path offset is prevented from occurring even if the relative positional relationship between the optical elements is slightly offset. This increases resistance to physical vibrations and thermal fluctuation, and can improve robustness of quantum absorption spectroscopy system 1. The single mode fibers can be freely bent or wound. This can save an installation space of the optical paths between the optical elements, as a result of which quantum absorption spectroscopy system 1 can be significantly downsized as compared with the spatial-type system configuration. For example, quantum absorption spectroscopy system 1 can be made compact to a size suitable to be carried. Then, measurement at a site where the sample is collected (what is called on-site measurement) can be achieved.

In contrast to the use of an infrared-range thermal light source and an infrared-range photodetector in the classical infrared absorption spectroscopy system, visible-range pump light source 11 and visible-range multi-pixel photodetector 302 are used in quantum absorption spectroscopy system 1. The use of the visible-range light source facilitates taking countermeasures against heat. Furthermore, the use of a photodetector having high sensitivity in the visible range eliminates the need for cooling with liquid nitrogen for reducing thermal noise. Thus, quantum absorption spectroscopy system 1 can be downsized further.

In general, the intensity of irradiated light in the classical infrared absorption spectroscopy system is on the order of milliwatts. Thus, a change in characteristics of the sample (including damage to the sample) resulting from heating by irradiated light may occur depending on the sample. In contrast, the idler light propagating through infrared SMF 210 in quantum absorption spectroscopy system 1 is very weak and on the order of femtowatts, for example. Therefore, heating of the sample during measurement is negligibly slight, which can prevent the characteristics of the sample from changing.

<Wideband SMF>

Figure 3:
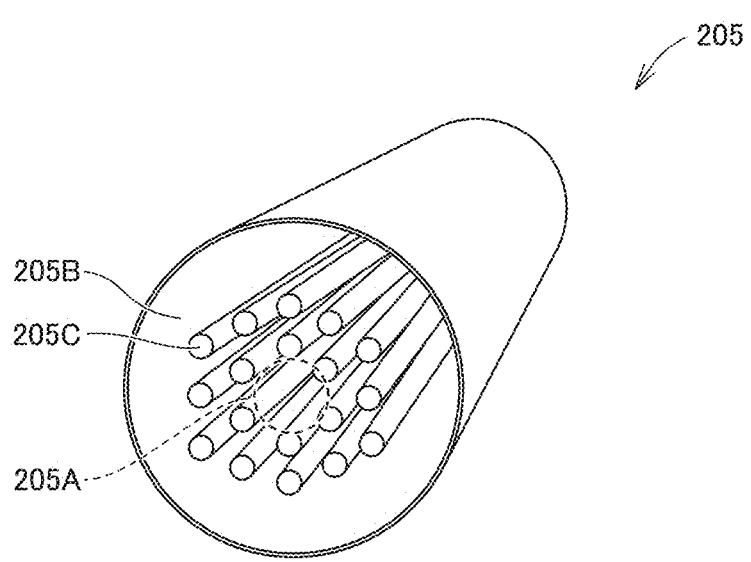
FIG. 3 is a diagram showing an example of a configuration of a wideband single mode fiber.

FIG. 3 is a diagram showing an example of a configuration of wideband SMF 205. Wideband SMF 205 preferably is a photonic crystal fiber (PCF). Wideband SMF 205 is, for example, a refractive index waveguide-type photonic crystal fiber, and includes a core 205A and a clad 205B. In clad 205B, a plurality of holes 205C are regularly laid out. Adjustment of the size of each of plurality of holes 205C and the distance between plurality of holes 205C enables single-mode optical transmission over a wide band. In the present embodiment, wideband SMF 205 propagates light in all the wavelength ranges of the pump light, the signal light, and the idler light in the single spatial mode (single mode).

Note that in the refractive index waveguide-type photonic crystal fiber, light is transmitted while repeating total reflection at the interface between the core and the clad similarly to typical optical fibers. Wideband SMF 205 is not limited to the refractive index waveguide-type but may be a photonic band gap-type photonic crystal fiber that transmits light confined by Bragg reflection.

<Tapered Fiber>

In the classical infrared absorption spectroscopy system, a sample is irradiated with finite-sized infrared light. In this case, the beam shape of irradiated light might be deformed (a phase wave front of irradiated light might be distorted) due to the state of a surface of the sample, such as microscopic irregularities present on the surface of the sample. Then, the signal intensity detected by the photodetector may be reduced to reduce the measurement sensitivity of the infrared absorption spectroscopy system. Thus, a tapered fiber is employed as infrared SMF 210 in quantum absorption spectroscopy system 1.

Figure 4:
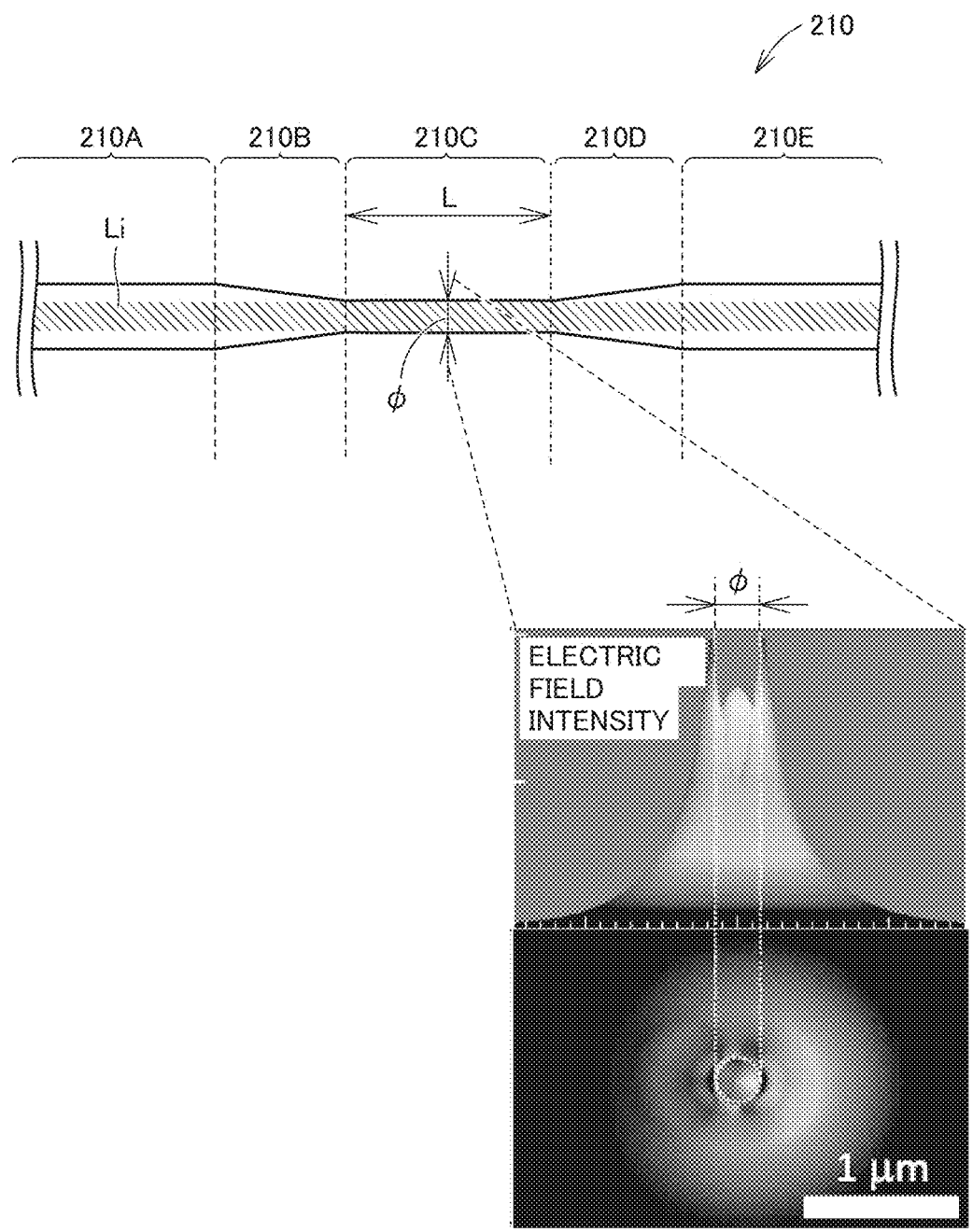
FIG. 4 is a diagram for describing a configuration of an infrared single mode fiber.

FIG. 4 is a diagram for describing a configuration of infrared SMF 210. Infrared SMF 210 has a non-tapered portion 210A, a tapered portion 210B, a taper waist portion 210C, a tapered portion 210C, and a non-tapered portion 210E. Tapered portion 210A and tapered portion 210B are arranged on one end of taper waist portion 210C. Tapered portion 210D and non-tapered portion 210E are arranged on the other end of taper waist portion 210C. Taper waist portion 210C preferably has a length L ranging from the micrometer order to the millimeter order.

Taper waist portion 210C is thinner than non-tapered portions 210A and 210E. In a case where tapered portion 210B which is a connection region between non-tapered portion 210A and taper waist portion 210C is changed sharply in diameter, loss in tapered portion 210B is great. Therefore, by gently (also expressed as "adiabatically") changing the diameter of tapered portion 210B, non-tapered portion 210A and taper waist portion 210C are smoothly connected. The same applies to connection between non-tapered portion 210E and taper waist portion 210C.

A diameter $\phi$ of taper waist portion 210C is typically on the micrometer order (preferably 1 μm or more and less than 20 μm), but may be on the sub-micrometer order (for example, 300 nm or more and less than 1 μm) depending on the wavelength of the idler light. In other words, a large part of diameter $\phi$ is included in the wavelength range from the visible range to the far-infrared range. In a case where diameter $\phi$ is on the nanometer order, infrared SMF 210 can also be called a "nano-optical fiber". Note that a general optical fiber for communication has a diameter of about 125 μm and has a mode field diameter of about 10 μm.

The idler light propagates through taper waist portion 210C with taper waist portion 210C as a whole serving as a core and the outside of taper waist portion 210C (which is usually gas such as air, but may be liquid or vacuum) serving as a clad. An oozing-out region called an evanescent field (near field) is thereby formed in the vicinity of the surface of taper waist portion 210C. FIG. 4 also shows simulation results of an electric field intensity distribution of the evanescent field. Taper waist portion 210C and sample holder 213 (see FIG. 1) are arranged sufficiently proximate to each other such that the evanescent field and the sample interact with each other.

Note that in the example shown in FIG. 4, the non-tapered portions and the tapered portions are present on the opposite ends of taper waist portion 210C. However, the non-tapered portion and the tapered portion may be present only on one end of taper waist portion 210C. In this case, a mirror structure (such as a Bragg grating) as a substitute for mirror 212 may be formed on the other end of taper waist portion 210C.

In quantum absorption spectroscopy system 1 in which the tapered fiber is employed, the interaction between the evanescent field of the idler light and the sample is measured instead of directly irradiating the sample with the idler light. This prevents reduction in signal intensity due to the state of the surface of the sample, which enables the measurement sensitivity of quantum absorption spectroscopy system 1 to be improved further. The infrared absorption spectroscopy characteristics of an extremely small amount of sample which is too small to be targeted for measurement in the classical infrared absorption spectroscopy system can also be measured.

In addition, the use of the tapered fiber enables the idler light to be focused on a microscopic region which is nearly the size of the wavelength of visible light or near-infrared light. In a case where a comparison is made under a condition that the total number of photons emitted from a light source is equal as will be described in detail in FIG. 5, the number density of photons of the idler light (flux of the idler light per unit cross-sectional area) in taper waist portion 210C is significantly higher than the number density of photons of the irradiated light in the classical infrared absorption spectroscopy system. As a result, the measurement sensitivity of quantum absorption spectroscopy system 1 can be improved further.

Irradiating the sample with the idler light focused to nearly the size of the wavelength using a high-powered objective lens is also conceivable. However, such a configuration can cause the idler light and the sample to interact with each other only in a range of several micrometers at the highest for the irradiating direction of the idler light. In contrast, in the case where the tapered fiber is used, the number density of photons is enhanced over the entire length of taper waist portion 210C. Length L of taper waist portion 210C may reach the millimeter order (1 mm or more). Therefore, it is possible to cause the evanescent field of the idler light and the sample to interact with each other over 1 mm or more. That is, the interaction length of the idler light and the sample can be about 1000 times as long as in the case of using a high-powered lens.

Figure 5:
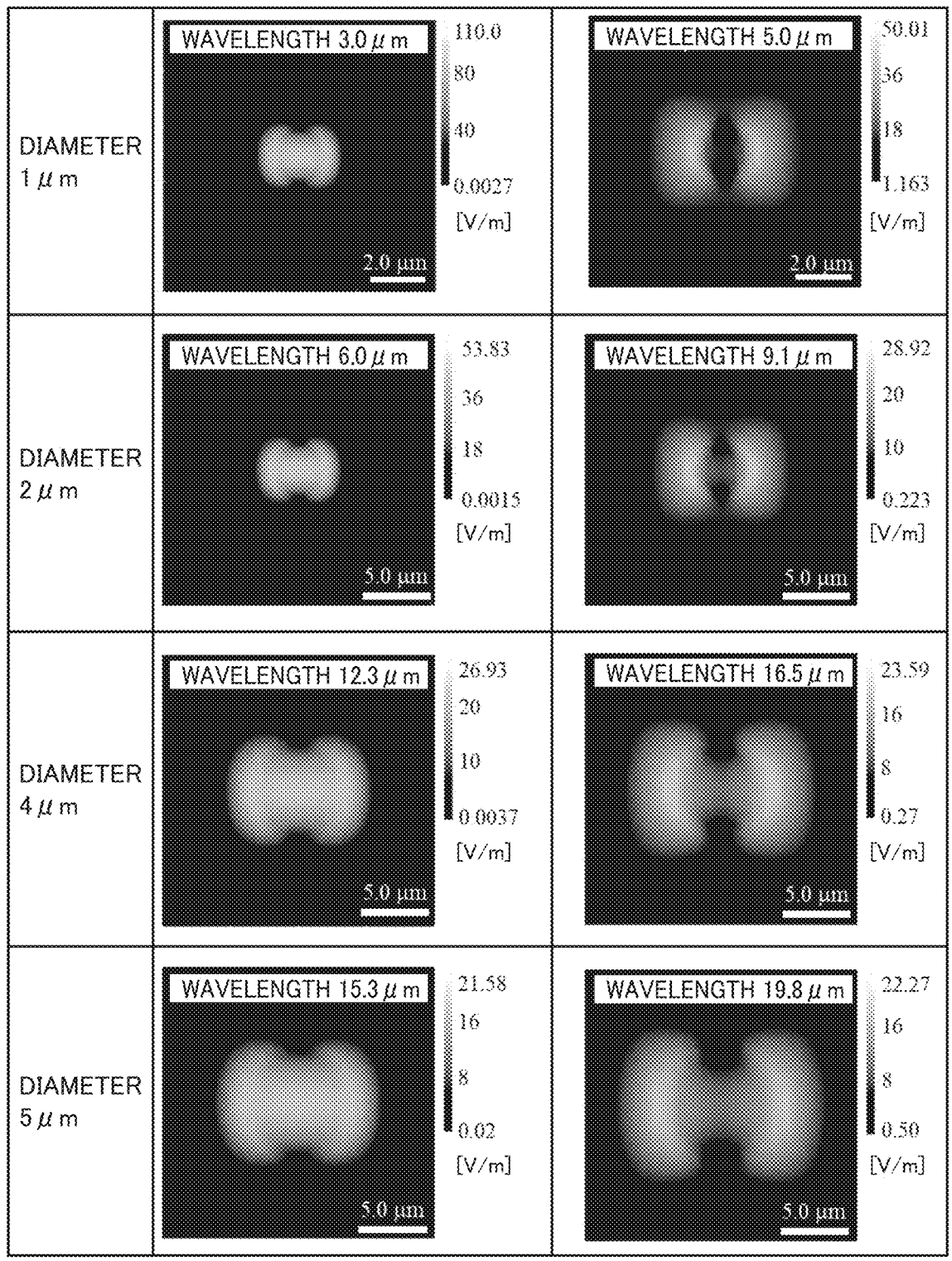
FIG. 5 is a diagram showing an example of simulation results concerning electric field intensity distributions in a cross section of a taper waist portion.

FIG. 5 is a diagram showing an example of simulation results concerning the electric field intensity distribution of a cross section of taper waist portion 210C. In this simulation, the finite-difference time-domain method (FDTD) by FDTD solutions of Lumerical Inc. was used.

FIG. 5 shows results of simulating a manner in which the idler light oozed out from taper waist portion 210C for various combinations of diameter φ of taper waist portion 210C and the wavelength of the idler light. Diameter φ of taper waist portion 210C was set at 1 µm, 2 µm, 4 µm, or 5 µm. The material of taper waist portion 210C in the case where diameter φ was 1 µm or 2 µm was infrared glass, specifically, chalcogenide glass ($As_2S_3$) which is the material of an optical fiber commercially available for infrared light propagation. The material of taper waist portion 210C in the case where diameter φ was 4 µm or 5 µm was $Ge_{33}As_{12}Se_{55}$ glass (refractive index: 2.4825). The light intensity of the idler light was about 18 pW.

The wavelength of the idler light at each diameter φ was set at a value with which the idler light propagated in the single mode at the diameter φ. Specifically, the wavelength range of the idler light capable of propagating in the single mode was 3.0 µm to 5.0 µm in the case where diameter φ was 1 µm, 6.0 µm to 9.1 µm in the case where diameter φ was 2 µm, 12.3 µm to 16.5 µm in the case where diameter φ was 4 µm, and 15.3 µm to 19.8 µm in the case where diameter φ was 5 µm. The results shown in FIG. 5 relate to the lower limit and upper limit of the above-described wavelength range (that is, the shortest wavelength and the longest wavelength in which the idler light propagates in the single mode).

The case where diameter φ of taper waist portion 210C was 1 µm will be described representatively. When the wavelength of the idler light was 3 µm, an electric field concentrated on the center of taper waist portion 210C and the vicinity of the surface thereof. The magnitude of the electric field at the surface of taper waist portion 210C was 110.0 [V/m]. This value is about 700 times larger than in a case of idler light having the same light intensity (18 pW) and having a beam size of 1 mm² propagating in free space without using an optical fiber. This is equivalent to an increase in the number density of photons of the idler light at the surface of taper waist portion 210C even by about five hundred thousand times. This enables the measurement sensitivity of the infrared absorption spectroscopy characteristics of the sample to be improved even by about five hundred thousand times.

When the wavelength of the idler light was 5 µm, a large part of the idler light propagated while oozing out to the outside of taper waist portion 210C. At this time, the magnitude of the electric field at the surface of taper waist portion 210C was 21.7 [V/m], which was smaller than in the case where the wavelength of the idler light was 3 µm. However, at a distance of about 1 µm from the surface of taper waist portion 210C, this relationship was reversed. The magnitude of the electric field at a position of about 3 µm from the surface of taper waist portion 210C, for example, was 13.8 [V/m]. This value is equivalent to an increase in the number density of photons by about 7500 times in the comparison similar to the foregoing. This also enables the measurement sensitivity of the infrared absorption spectroscopy characteristics of the sample to be improved by about 7500 times.

Also in the case where diameter φ of taper waist portion 210C was 2 µm, 4 µm, or 5 µm, when the wavelength of the idler light was short, the electric field concentrated on the center of taper waist portion 210C and the vicinity of the surface thereof similarly to the case in which diameter φ was 1 µm. On the other hand, when the wavelength of the idler light was long, the electric field greatly oozed out to the outside of taper waist portion 210C, and a large part of the idler light propagated outside taper waist portion 210C. Although detailed description is not repeated, by what times the number density of photons of the idler photon is increased as compared with propagation in the free space (as a result, by what times the measurement sensitivity of the infrared absorption spectroscopy characteristics of the sample can be improved) can be estimated similarly from the magnitude of the electric field described in FIG. 5.

As described above, in the wavelength range which enables single mode propagation, the infrared absorption spectroscopy characteristics of the sample can be measured with higher sensitivity in the case where the wavelength of the idler light is short than in the case where the wavelength of the idler light is long. However, in the case where the wavelength of the idler light is short, it is necessary to bring the sample closer to taper waist portion 210C because of the concentration of the electric field on the vicinity of the surface of taper waist portion 210C. This increases a risk that the sample comes into contact with taper waist portion 210C to cause breakage or contamination of taper waist portion 210C. In contrast, in the case where the wavelength of the idler light is long, measurement with sensitivity dramatically higher than in propagation in the free space can be achieved while avoiding breakage or contamination of taper waist portion 210C that would be caused by contact with the sample.

FIG. 6 is a diagram showing a summarized relationship between diameter φ of taper waist portion 210C and wavelength range of idler light. As shown in FIG. 6, setting diameter φ of taper waist portion 210C to fall within a range of 0.5 µm to 5 µm enables the idler light to propagate in the single mode across the whole wavelength range from about 1 µm to about 20 µm. In other words, by selecting infrared SMF 210 having appropriate diameter φ in accordance with the wavelength of the idler light, it is possible to propagate the idler light through infrared SMF 210 in the single mode.

The case in which the wavelength of the idler light is 5 µm, for example, enables single-mode propagation even with diameter φ=1 µm or diameter φ=1.5 µm. It is desirable to select infrared SMF 210 having larger diameter φ in a range where wavelengths which enables single-mode propagation overlap. Since taper waist portion 210C is thus unlikely to be broken, durability of infrared SMF 210 can be improved.

In the case where the wavelength of the idler light is 2 µm or less, silica-based glass can be used as the material of infrared SMF 210 instead of infrared glass. Silica-based glass has a refractive index lower than the refractive index of infrared glass. Therefore, silica-based glass enables single-mode propagation even if diameter φ of taper waist portion 210C is set to be larger than with infrared glass. In the case where the wavelength of the idler light is 2 µm, for example, silica-based glass enables diameter ϕ to be set at 1 µm while diameter ϕ is inevitably set at 0.5 µm with infrared glass. This can improve durability of infrared SMF 210. Since silica-based glass is more inexpensive than infrared glass, component cost can be reduced.

Light that propagates through single mode fibers such as infrared SMF 210 is not limited to single-mode light. Light in two or more (specifically, two to four) spatial modes may propagate through these single mode fibers. In other words, the "single mode fiber portion" according to the present disclosure may include a few mode fiber (FEF).

In a case where diameter ϕ of taper waist portion 210C is 1 µm and the wavelength of the idler light is about 2.5 µm, infrared SMF 210 functions as the few mode fiber. The wavelength of the idler light when infrared SMF 210 functioned as the few mode fiber was about 5 µm in the case where diameter ϕ=2 about 11 µm in the case where diameter ϕ=4 and about 13 µm in the case where diameter ϕ=5 µm.

The use of infrared SMF 210 as the few mode fiber in addition to the single mode fiber can widen the measurable wavelength range although visibility of quantum interference may be reduced as compared with the case of using infrared SMF 210 only as the single mode fiber. By making the wavelength of the idler light further shorter than in the case of using infrared SMF 210 as the few mode fiber, infrared SMF 210 can be made adaptable to a further wider band. In this case, the number density of photons increases although visibility of quantum interference may be reduced further, so that improvement of measurement sensitivity can be expected as compared with the case of propagating the idler light through the free space.

In the case where the wavelength of the idler light is 5 µm, for example, diameter ϕ=2 µm can be set if the idler light is propagated in the few mode while it is requested that diameter ϕ=1 µm or 1.5 µm in order to propagate the idler light in the single mode. As described above, diameter ϕ of taper waist portion 210C can be made thicker by utilizing the function as the few mode fiber, so that durability of infrared SMF 210 can be improved.

First Modification of First Embodiment

Figure 7:
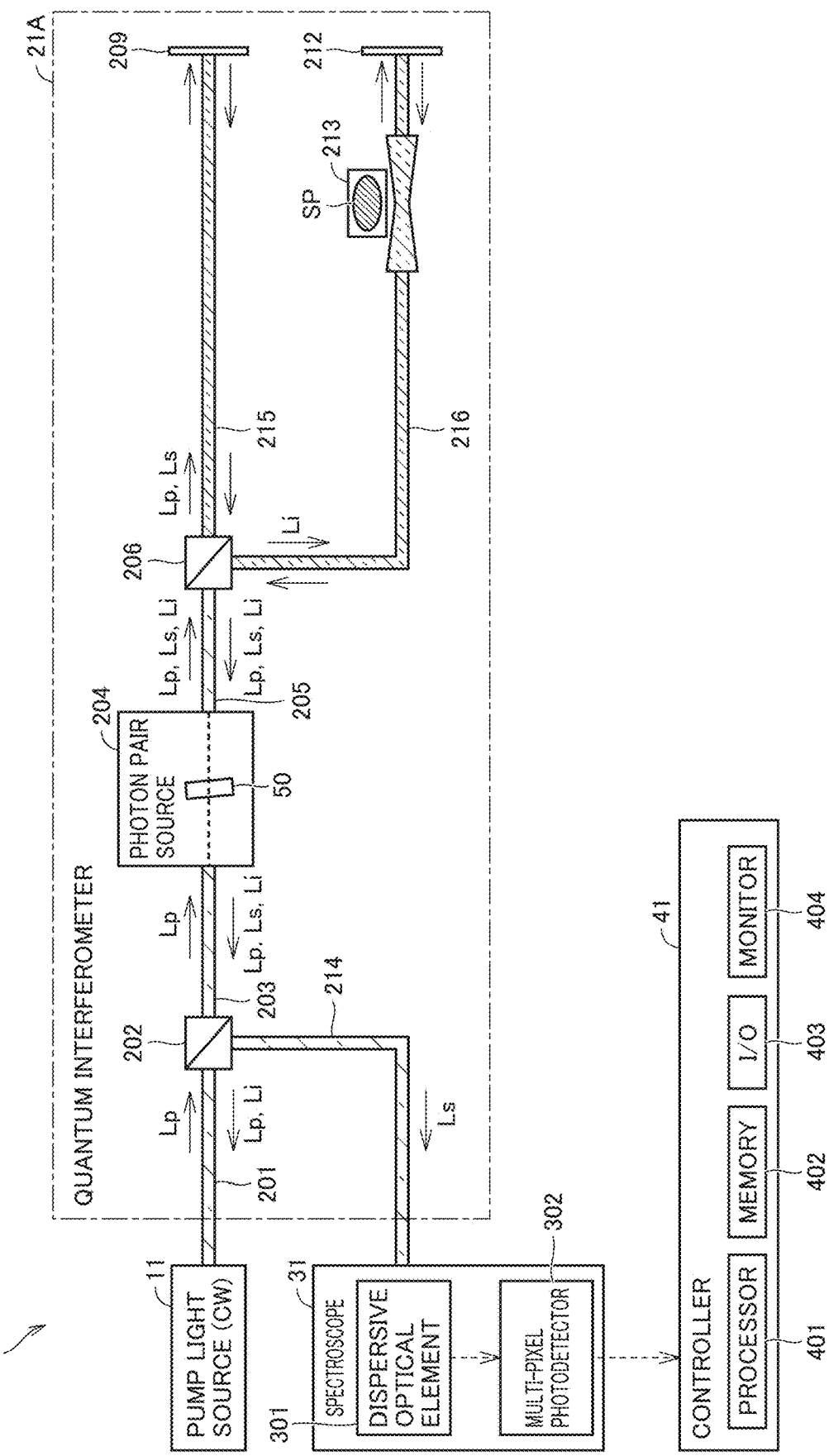
FIG. 7 is a diagram schematically showing the overall configuration of a quantum absorption spectroscopy system according to a first modification of the first embodiment.

FIG. 7 is a diagram schematically showing the overall configuration of a quantum absorption spectroscopy system according to a first modification of the first embodiment. A quantum absorption spectroscopy system 1A is different from quantum absorption spectroscopy system 1 (see FIG. 1) according to the first embodiment in that a quantum interferometer 21A is included instead of quantum interferometer 21. Quantum interferometer 21A is different from quantum interferometer 21 in that optical fibers 215 and 216 are included instead of visible SMF 207 and infrared SMF 210 and in that polarization controllers 208 and 211 are not included.

While visible SMF 207 and infrared SMF 210 are typical single mode fibers (SMFs), optical fibers 215 and 216 are polarization maintaining fibers (PMFs). Optical fiber 215 maintains polarization of light (visible light) in the wavelength range of the signal photon. On the other hand, optical fiber 216 maintains polarization of light (infrared light) in the wavelength range of the idler photon. Therefore, in the first modification, polarization controllers 208 and 211 for correcting polarization disturbance of photons propagating through the single mode fibers can be omitted. Note that only one of visible SMF 207 and infrared SMF 210 may be replaced by a polarization maintaining fiber.

Second Modification of First Embodiment

Figure 8:
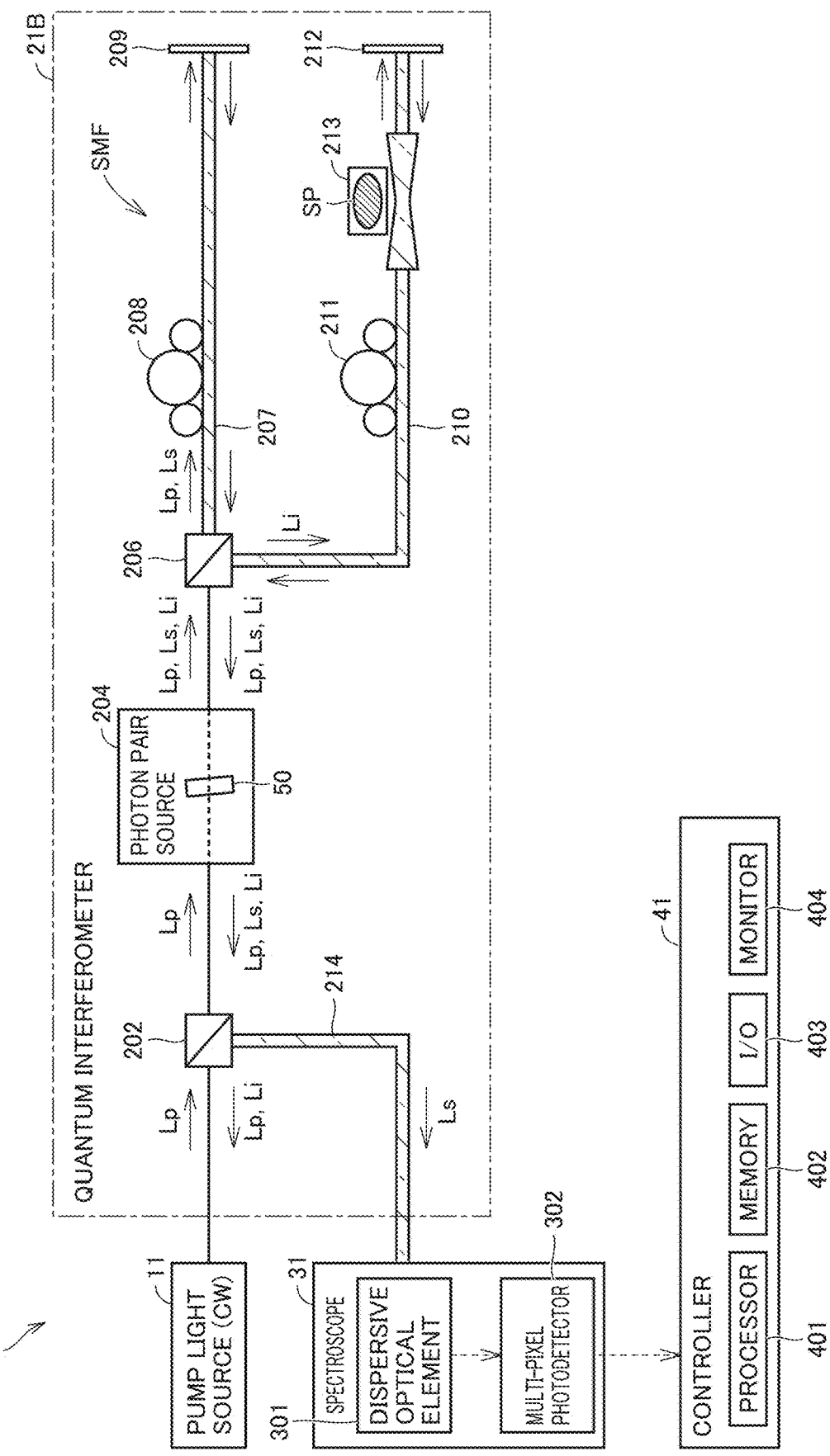
FIG. 8 is a diagram schematically showing the overall configuration of a quantum absorption spectroscopy system according to a second modification of the first embodiment.

FIG. 8 is a diagram schematically showing the overall configuration of a quantum absorption spectroscopy system according to a second modification of the first embodiment. A quantum absorption spectroscopy system 1B is different from quantum absorption spectroscopy system 1 (see FIG. 1) according to the first embodiment in that a quantum interferometer 21B is included instead of quantum interferometer 21. Quantum interferometer 21B is different from quantum interferometer 21 in that optical fibers 201, 203 and wideband SMF 205 are not included. As shown in FIG. 8, a configuration in which some optical elements included in quantum interferometers 21 and 21A are optically coupled with single mode fibers, while the remaining optical elements are not coupled with the single mode fibers (a configuration in which light propagates through the free space) may be employed.

In quantum absorption spectroscopy systems 1A and 1B, the propagation paths of the quantum entanglement photon pair are also configured by the single mode fibers. Thus, the first and second modifications of the first embodiment can also improve the measurement sensitivity of quantum absorption spectroscopy systems 1A and 1B, and can improve robustness of quantum absorption spectroscopy systems 1A and 1B. Also in the first and second modifications of the first embodiment, the idler light is focused using the tapered fiber. Thus, the measurement sensitivity of quantum absorption spectroscopy systems 1A and 1B can be improved further.

It is desirable to modularize the single mode fibers in quantum interferometers 21, 21A, and 21B together with the optical elements optically coupled to the single mode fibers. In particular, it is desirable to modularize the idler optical path in which infrared SMF 210 which is a tapered fiber is employed. This makes it possible to appropriately select infrared SMF 210 corresponding to the purpose of use from among various infrared SMFs 210 different in diameter ϕ of taper waist portion 210C and to perform measurement. In addition, in a case where taper waist portion 210C is broken when the sample is installed, for example, infrared SMF 210 can be easily replaced by a new product.

Instead of modularizing infrared SMF 210 as a whole, a tapered fiber region (a region including tapered portions 210B, 210D and taper waist portion 210C) may be partially modularized. Alternatively, instead of the tapered fiber region, a ridge waveguide or hollow-beam optical waveguide having a width ranging from the sub-micrometer order to the micrometer order can also be used.

Second Embodiment

In the first embodiment, the configuration in which the signal light is spectrally dispersed by spectroscope 31 has been described. In a second embodiment, a configuration in which signal light is wavelength-resolved without using spectroscope 31 will be described.

<System Overall Configuration>

Figure 9:
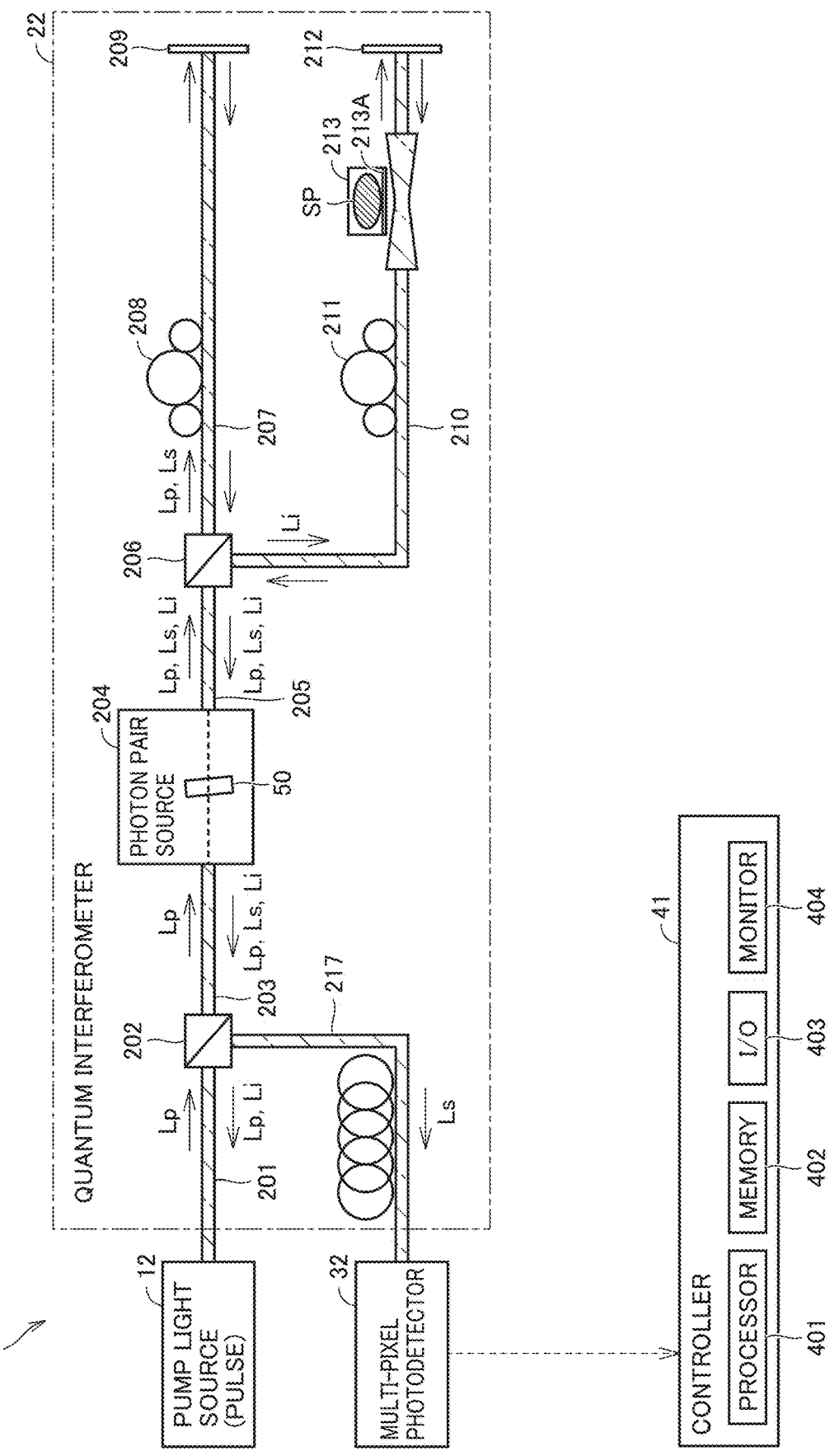
FIG. 9 is a diagram schematically showing the overall configuration of a quantum absorption spectroscopy system according to a second embodiment.

FIG. 9 is a diagram schematically showing the overall configuration of a quantum absorption spectroscopy system according to the second embodiment. A quantum absorption spectroscopy system 2 is different from quantum absorption spectroscopy system 1 (see FIG. 1) according to the first embodiment in that an pump light source 12 is included instead of pump light source 11, a quantum interferometer 22 is included instead of quantum interferometer 21, and a single-pixel photodetector 32 is included instead of spectroscope 31. Quantum interferometer 22 is different from quantum interferometer 21 in that an optical fiber 217 is included instead of optical fiber 214.

While pump light source 11 in the first embodiment emits continuous-wave laser light, pump light source 12 emits pulsed wave laser light. This enables a quantum entanglement photon pair to be generated with high efficiency (see a high gain region in FIG. 11).

Optical fiber 217 optically couples dichroic splitter 202 and single-pixel photodetector 32. Optical fiber 217 is a single mode fiber that propagates light (visible light) in the wavelength range of the signal light in the single mode. In the second embodiment, optical fiber 217 is a wavelength dispersion fiber in which the propagation time of the signal light varies depending on the wavelength. When the signal light propagates through optical fiber 217, a short-wavelength component of the signal light reaches single-pixel photodetector 32 relatively late, while a long-wavelength component of the signal light reaches single-pixel photodetector 32 relatively early.

Single-pixel photodetector 32 is a silicon-based photodetector including a single pixel, and has optical characteristics capable of detecting visible light. Specifically, single-pixel photodetector 32 is a photodiode such as a PIN photodiode or an avalanche photodiode (APD). Alternatively, a photoelectric tube or a photomultiplier tube may be employed instead of the photodiode. In order to obtain a high signal-noise ratio, a superconducting single photon detector (SSPD) can also be employed. Single-pixel photodetector 32 detects signal light in accordance with control exerted by controller 41 and outputs a detection signal thereof to controller 41.

Controller 41 measures the wavelength of a signal photon based on the time at which the signal photon is detected. Describing more particularly, pump light source 12 which is a pulsed light source is employed in the second embodiment. Therefore, a plurality of quantum entanglement photon pairs are generated in a minute duration in association with irradiation with pump light which is a pulsed wave, and a plurality of signal photons thereby reach optical fiber 217 substantially simultaneously. Propagation of these signal photons through optical fiber 217 which is the wavelength dispersion fiber causes a delay depending on the wavelength of the signal photons. Therefore, a time difference between the time of irradiation with the pump light and the time at which the signal photons reach single-pixel photodetector 32 includes information concerning the wavelength of the signal photons. Thus, by recording the time difference, controller 41 can measure the wavelength of the signal photons. Since components other than the above-described components of quantum absorption spectroscopy system 2 are similar to corresponding components of quantum absorption spectroscopy system 1 according to the first embodiment, description thereof will not be repeated.

As described above, the optical elements of quantum interferometer 22 are also optically coupled with the single mode fibers in the second embodiment similarly to the first embodiment. This enables the measurement sensitivity of quantum absorption spectroscopy system 2 to be improved and robustness of quantum absorption spectroscopy system 2 to be improved. In the second embodiment, the idler light is focused using infrared SMF 210 which is the tapered fiber. Thus, the measurement sensitivity of quantum absorption spectroscopy system 2 can be improved further.

Furthermore, spectroscope 31 can be replaced by single-pixel photodetector 32 because the signal light is spectrally dispersed using optical fiber 217 which is the wavelength dispersion fiber in the second embodiment. Therefore, according to the second embodiment, quantum absorption spectroscopy system 2 can be downsized further and component cost can be reduced.

<Gain Dependency>

Further consideration results concerning the measurement sensitivity of quantum absorption spectroscopy system 2 will be described. A generation rate of quantum entanglement photon pairs is determined by a combination of the intensity of the pump light and conversion efficiency of an element (for example, nonlinear optical crystal 50) for generating quantum entanglement photon pairs. A region in which quantum entanglement photon pairs are generated at a sufficiently higher rate than at a reference rate defined by a generation bandwidth of quantum entanglement photon pairs is called a "high gain region", and a region in which quantum entanglement photon pairs are generated at a lower rate is called a "low gain region".

As a specific example, in a case where a photon generated in the infrared region in the quantum entanglement photon pair has a generation bandwidth of 300 nm centering on a wavelength of 4500 nm, the reference rate is such a rate that one quantum entanglement photon pair is generated for about 100 fs. In the low gain region in which the generation rate of quantum entanglement photon pairs is lower than this reference rate, the intensity of the pump light should only be 1 µW or less in a case where nonlinear optical crystal 50 is pumped by a continuous wave. On the other hand, in the high gain region, a plurality of (approximately several to a hundred) quantum entanglement photon pairs are generated for 100 fs, for example. In the case where nonlinear optical crystal 50 is pumped by a continuous wave, it is necessary to set the intensity of the pump light at approximately 1 mW. However, in the case where nonlinear optical crystal 50 is pumped by a pulsed wave, pump light localized in a time domain instantaneously has a high light intensity, so that the generation rate of quantum entanglement photon pairs might reach the high gain region at a lower average intensity. As will be described below, the high gain region and the low gain region exhibit a different tendency in the intensity of the detection signal of single-pixel photodetector 32.

Figure 10:
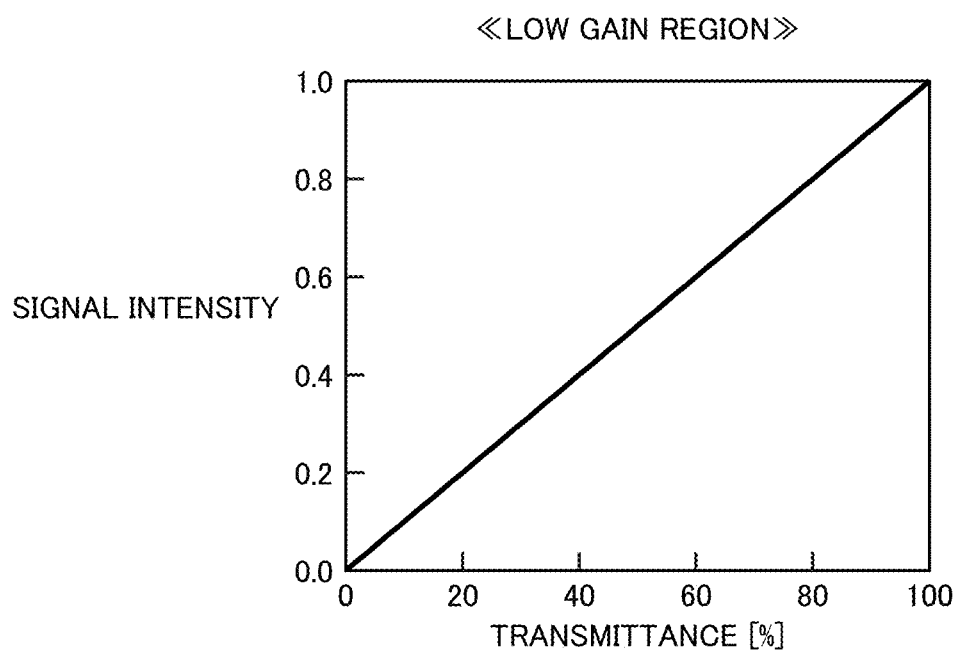
FIG. 10 is a diagram showing a relationship between sample transmittance and signal intensity of a single-pixel photodetector in a low gain region.
Figure 11:
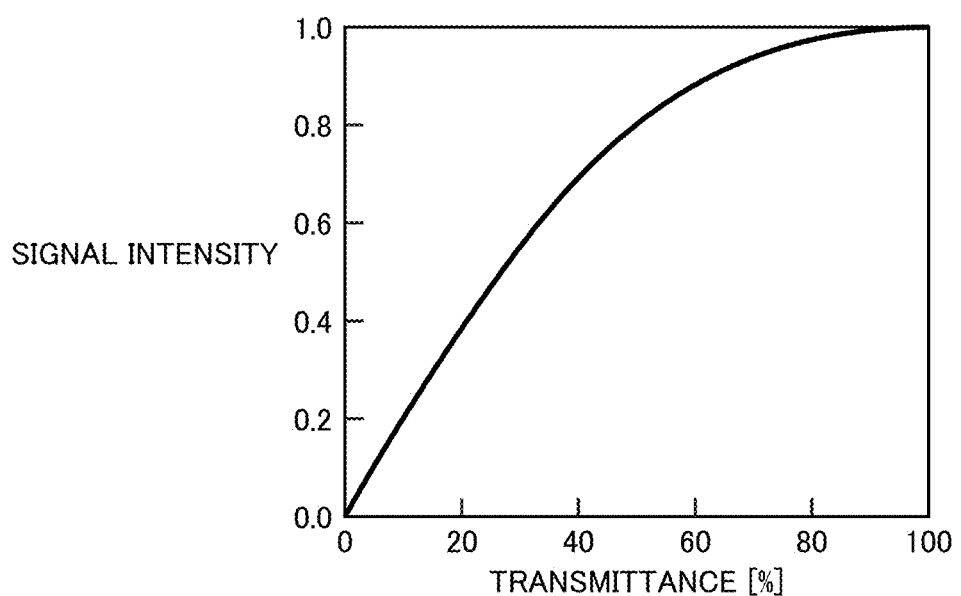
FIG. 11 is a diagram showing a relationship between sample transmittance and signal intensity of the single-pixel photodetector in a high gain region.

FIG. 10 is a diagram showing a relationship between sample transmittance and signal intensity of single-pixel photodetector 32 in the low gain region. FIG. 11 is a diagram showing a relationship between sample transmittance and signal intensity of single-pixel photodetector 32 in the high gain region. In FIG. 10 and FIG. 11, the horizontal axis represents sample transmittance (transmittance of the idler photon concerning the sample). The vertical axis represents signal intensity (intensity of the detection signal of single-pixel photodetector 32). It can also be said that this signal intensity is an index indicating visibility of quantum interference.

In the low gain region, the signal intensity increases linearly as the sample transmittance rises. In contrast, in the high gain region, the signal intensity increases non-linearly as the sample transmittance rises. In a range in which the sample transmittance is high (that is, a range in which the sample absorbs only a small amount of idler photons), the signal intensity hardly increases even if the sample transmittance rises. In a range proximate to a sample transmittance of 100%, the signal intensity has an inclination (rate of change) close to zero. This means that a weak absorption of idler photons by the sample cannot be detected with high accuracy even though improvement of measurement sensitivity of quantum absorption spectroscopy system 2 is expected in the high gain region in which the quantum entanglement photon pair is generated with high efficiency.

Thus, in the case of using the high gain region, it is desirable to install an absorber 213A of idler light on sample holder 213, for example, as shown in FIG. 9. Absorber 213A is preferably a material whose absorption spectrum in the infrared region is known or a material whose absorption spectrum in the infrared region is flat, and is, for example, an infrared absorption filter. By causing absorber 213A to absorb the idler light, the sample transmittance is intentionally reduced. In the example shown in FIG. 11, the sample transmittance can be reduced to approximately 40% to 60%. This enables a change amount of signal intensity with change in sample transmittance to be increased as compared with a case in which absorber 213A is not installed. As a result, it is possible to improve the measurement sensitivity of quantum absorption spectroscopy system 2.

First Modification of Second Embodiment

Figure 12:
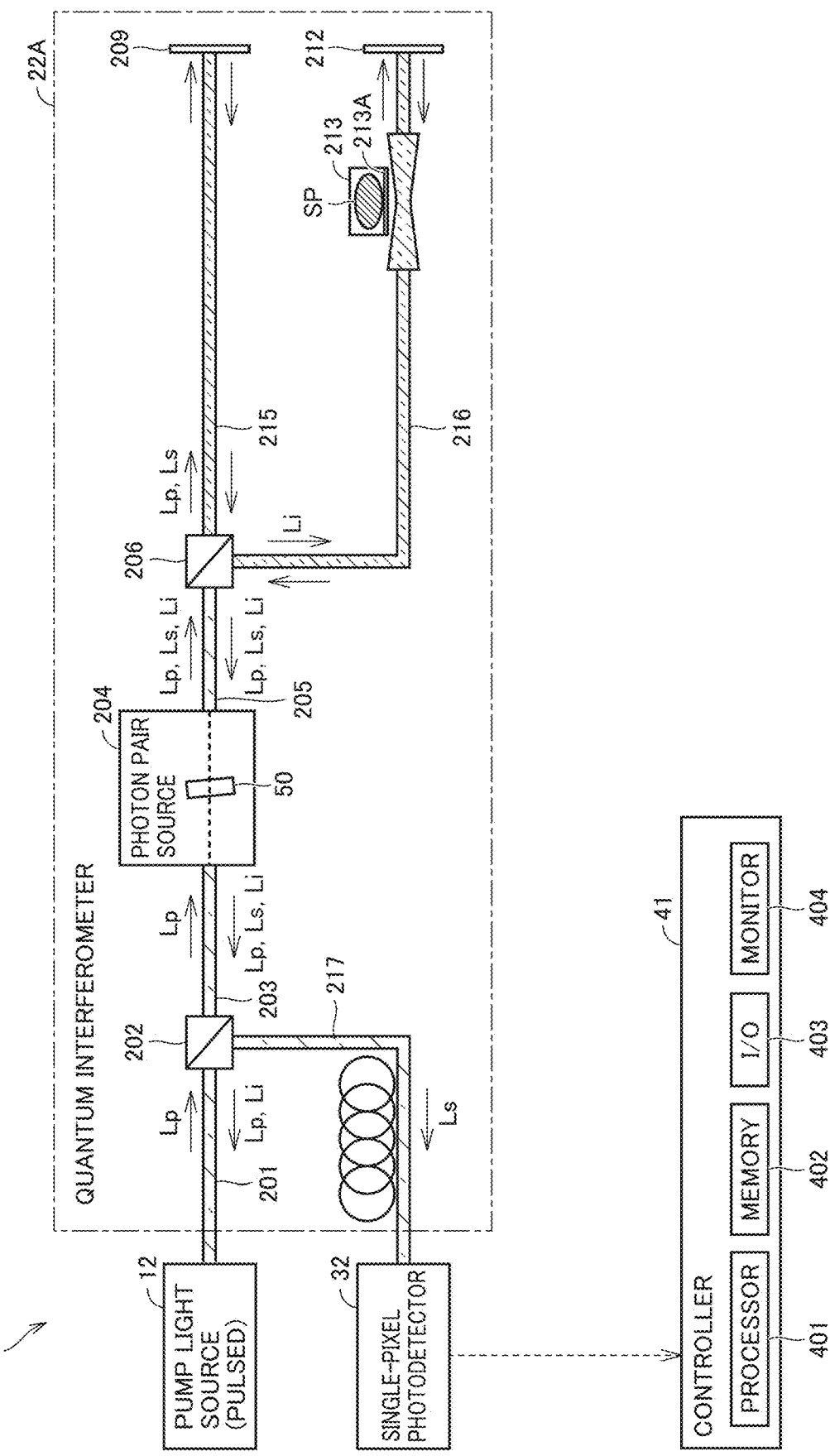
FIG. 12 is a diagram schematically showing the overall configuration of a quantum absorption spectroscopy system according to a first modification of the second embodiment.

FIG. 12 is a diagram schematically showing the overall configuration of a quantum absorption spectroscopy system according to a first modification of the second embodiment. A quantum absorption spectroscopy system 2A is different from quantum absorption spectroscopy system 2 (see FIG. 9) according to the second embodiment in that a quantum interferometer 22A is included instead of quantum interferometer 22. Quantum interferometer 22A is different from quantum interferometer 22 in that optical fibers 215 and 216 are included instead of visible SMF 207 and infrared SMF 210 and in that polarization controllers 208 and 211 are not included. Optical fibers 215 and 216 are polarization maintaining fibers. Since the polarization maintaining fibers have been described in detail in the first modification (see FIG. 7) of the first embodiment, description thereof will not be repeated.

Second Modification of Second Embodiment

Figure 13:
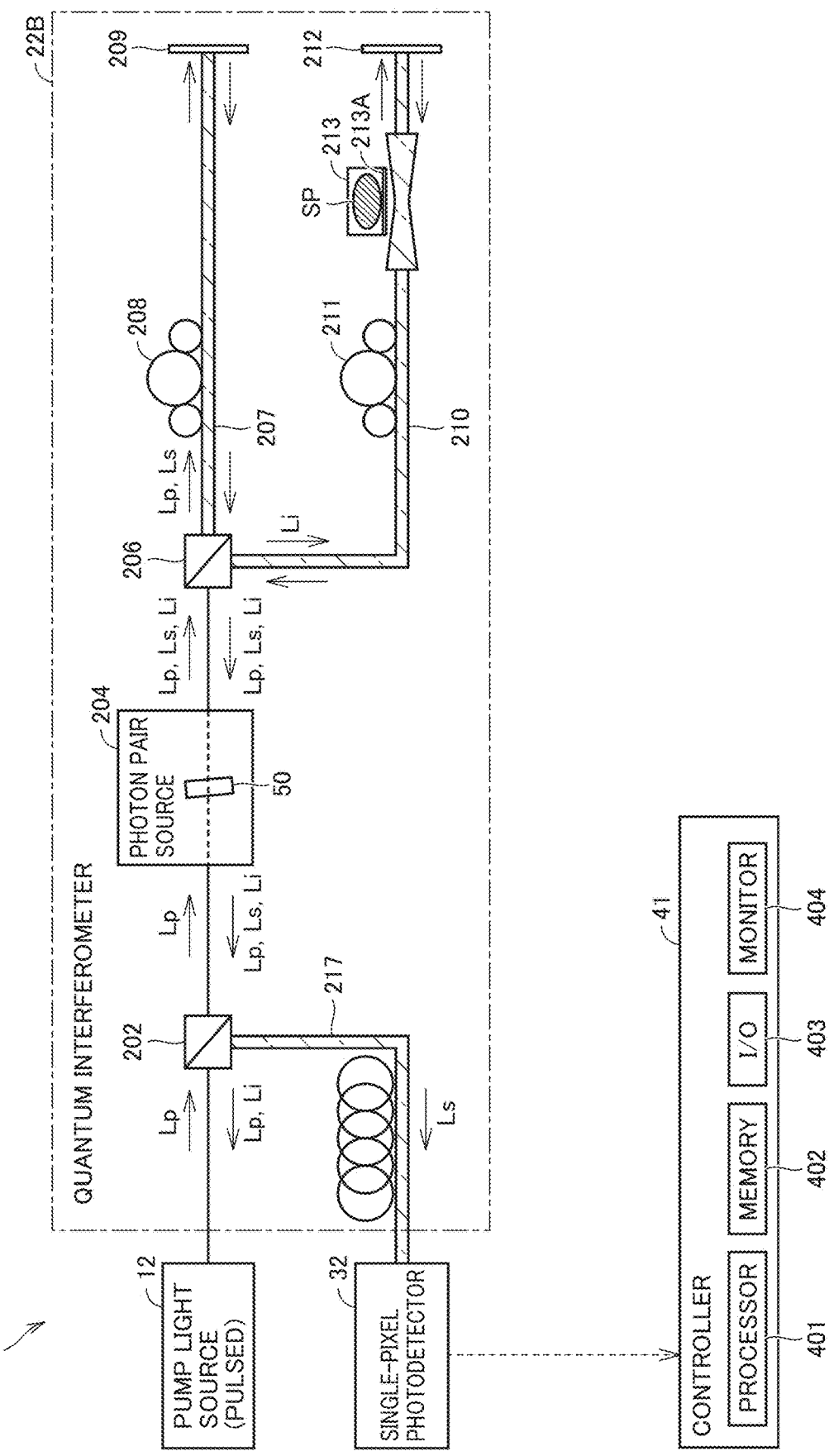
FIG. 13 is a diagram schematically showing the overall configuration of a quantum absorption spectroscopy system according to a second modification of the second embodiment.

FIG. 13 is a diagram schematically showing the overall configuration of a quantum absorption spectroscopy system according to a second modification of the second embodiment. A quantum absorption spectroscopy system 2B is different from quantum absorption spectroscopy system 2 (see FIG. 9) according to the second embodiment in that a quantum interferometer 22B is included instead of quantum interferometer 22. Quantum interferometer 22B is different from quantum interferometer 22 in that optical fibers 201, 203 and wideband SMF 205 are not included.

In quantum absorption spectroscopy systems 2A and 2B, the propagation paths of the quantum entanglement photon pair are also configured by single mode fibers. Thus, the first and second modifications of the second embodiment also enable the measurement sensitivity of quantum absorption spectroscopy systems 2A and 2B to be improved and robustness of quantum absorption spectroscopy systems 2A and 2B to be improved. In the first and second modifications of the second embodiment, the idler light is also focused using the tapered fiber. Thus, the measurement sensitivity of quantum absorption spectroscopy systems 2A and 2B can be improved further.

Third Embodiment

In a third embodiment, a configuration in which the infrared absorption spectroscopy characteristics of the sample are measured without using a tapered fiber will be described.

Figure 14:
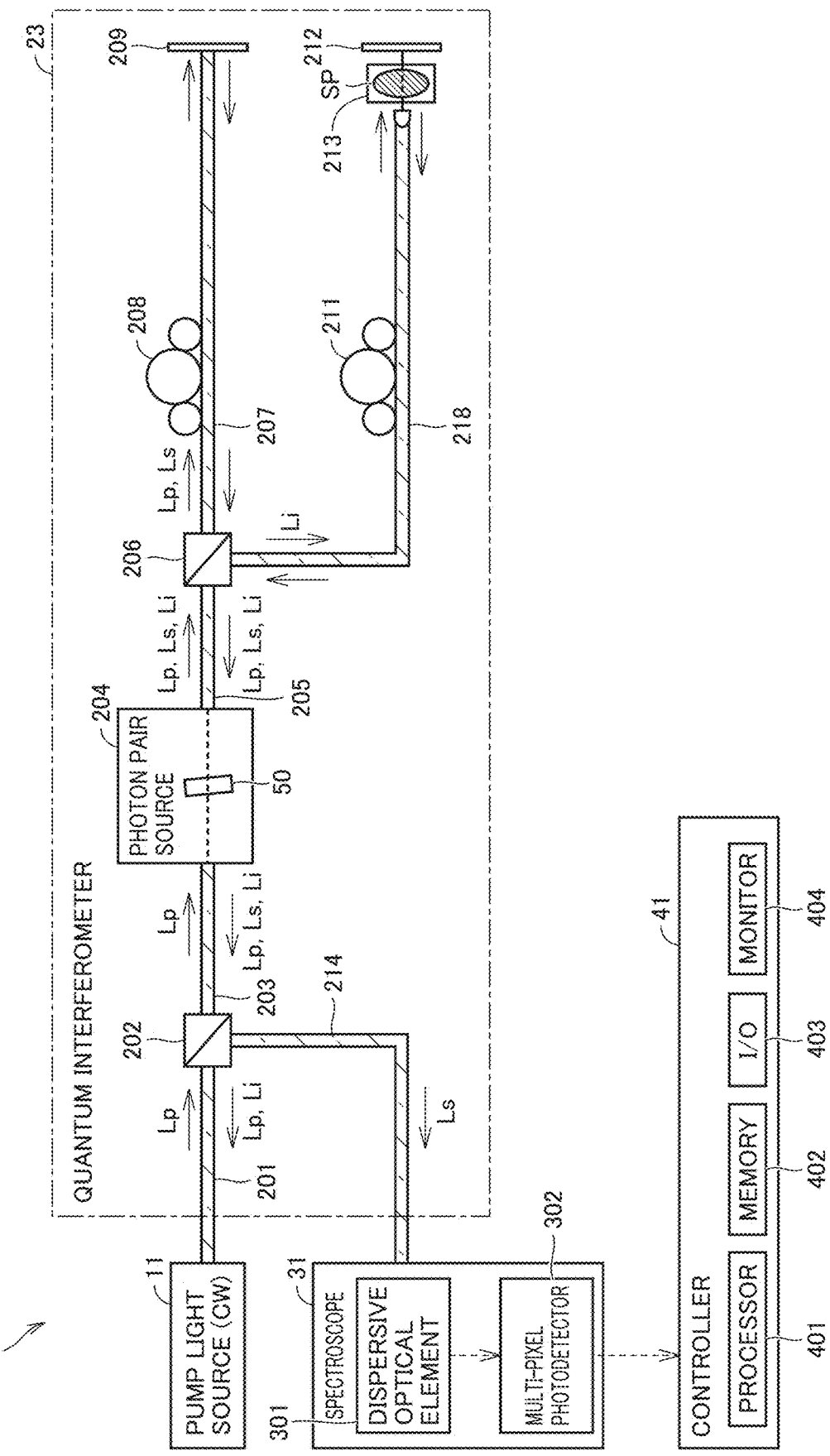
FIG. 14 is a diagram schematically showing the overall configuration of a quantum absorption spectroscopy system according to a third embodiment.

FIG. 14 is a diagram schematically showing the overall configuration of a quantum absorption spectroscopy system according to the third embodiment. A quantum absorption spectroscopy system 3 is different from quantum absorption spectroscopy system 1 (see FIG. 1) according to the first embodiment in that a quantum interferometer 23 is included instead of quantum interferometer 21. Quantum interferometer 23 is different from quantum interferometer 21 in that an infrared SMF 218 not provided with taper waist portion 210C (see FIG. 4) is included instead of infrared SMF 210.

In the third embodiment, the sample is installed in the vicinity of an end of infrared SMF 218. The idler light emitted from the end of infrared SMF 218 to the free space is transmitted through the sample and reflected by mirror 212. The idler light reflected by mirror 212 is transmitted through the sample again and returns to infrared SMF 218 from the end of infrared SMF 218. Since components other than the above-described components of quantum absorption spectroscopy system 3 are similar to corresponding components of quantum absorption spectroscopy system 1 according to the first embodiment, description thereof will not be repeated.

As described above, in the third embodiment, optical elements of quantum interferometer 23 are also optically coupled with the single mode fibers similarly to the first and second embodiments. This enables measurement sensitivity of quantum absorption spectroscopy system 3 to be improved and robustness of quantum absorption spectroscopy system 3 to be improved.

Improvement of measurement sensitivity through use of the single mode fibers depends on unitary selection of a spatial mode of light to be used for measurement. In a quantum absorption spectroscopy system (the measurement system used in NPL 1, for example) in which mode selection by single mode fibers is not performed, all spatial modes of quantum entanglement photon pairs generated from a non-linear optical crystal contribute to the quantum interference signal, so that quantum interference signals having different phases are superimposed. As a result, visibility of quantum interference is reduced, thus reducing the measurement sensitivity. In contrast, according to the present embodiment in which mode selection by the single mode fibers is performed, higher visibility of quantum interference can be expected, and improvement of measurement sensitivity can thereby be expected.

First Modification of Third Embodiment

Figure 15:
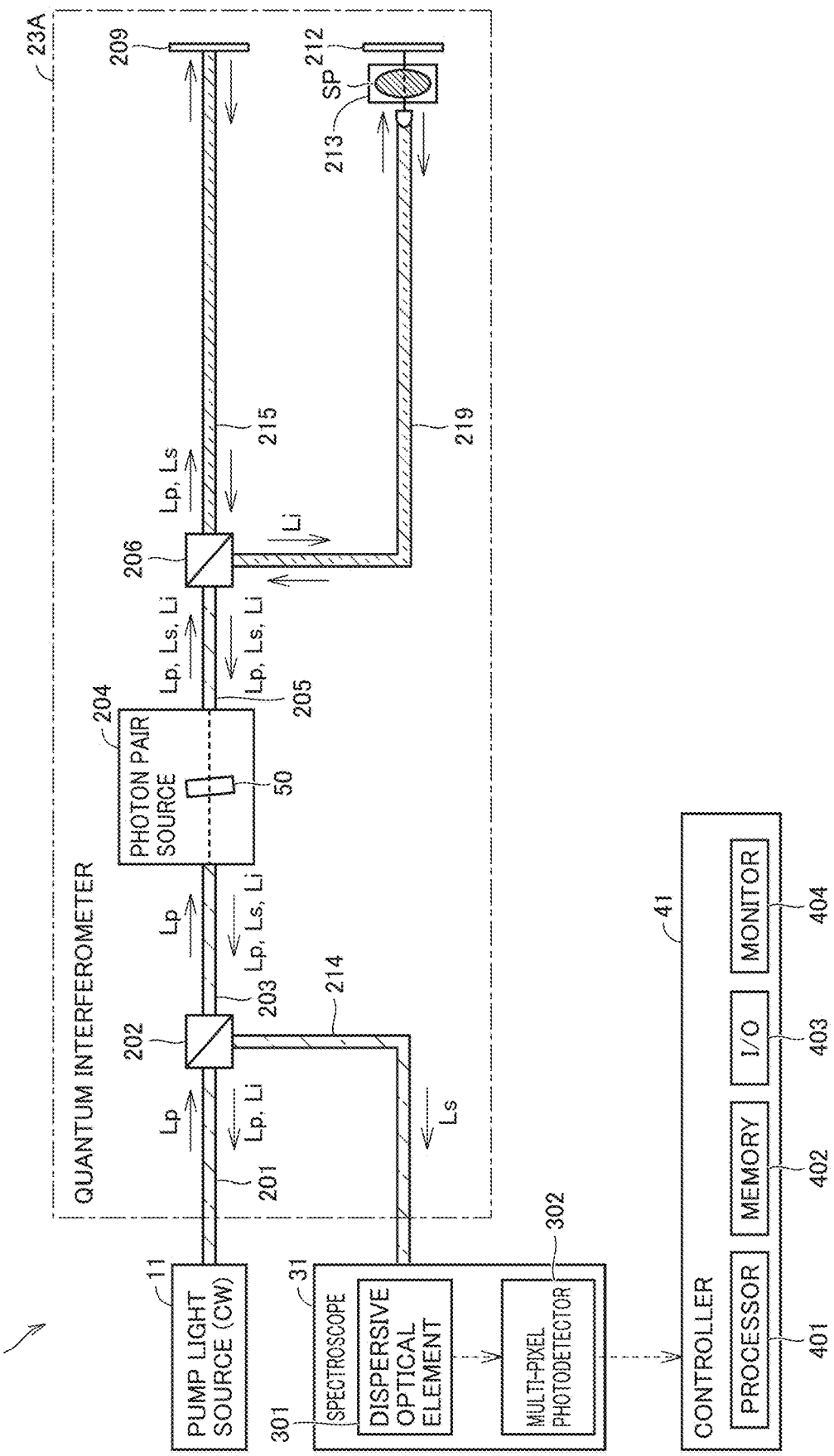
FIG. 15 is a diagram schematically showing the overall configuration of a quantum absorption spectroscopy system according to a first modification of the third embodiment.

FIG. 15 is a diagram schematically showing the overall configuration of a quantum absorption spectroscopy system according to a first modification of the third embodiment. A quantum absorption spectroscopy system 3A is different from quantum absorption spectroscopy system 3 (see FIG. 14) according to the third embodiment in that a quantum interferometer 23A is included instead of quantum interferometer 23. Quantum interferometer 23A is different from quantum interferometer 23 in that optical fibers 215 and 219 are included instead of visible SMF 207 and infrared SMF 218 and in that polarization controllers 208 and 211 are not included. Optical fiber 215 and 219 are polarization maintaining fibers. Since the polarization maintaining fibers have been described in detail in the first modification (see FIG. 7) of the first embodiment, description thereof will not be repeated.

Second Modification of Third Embodiment

Figure 16:
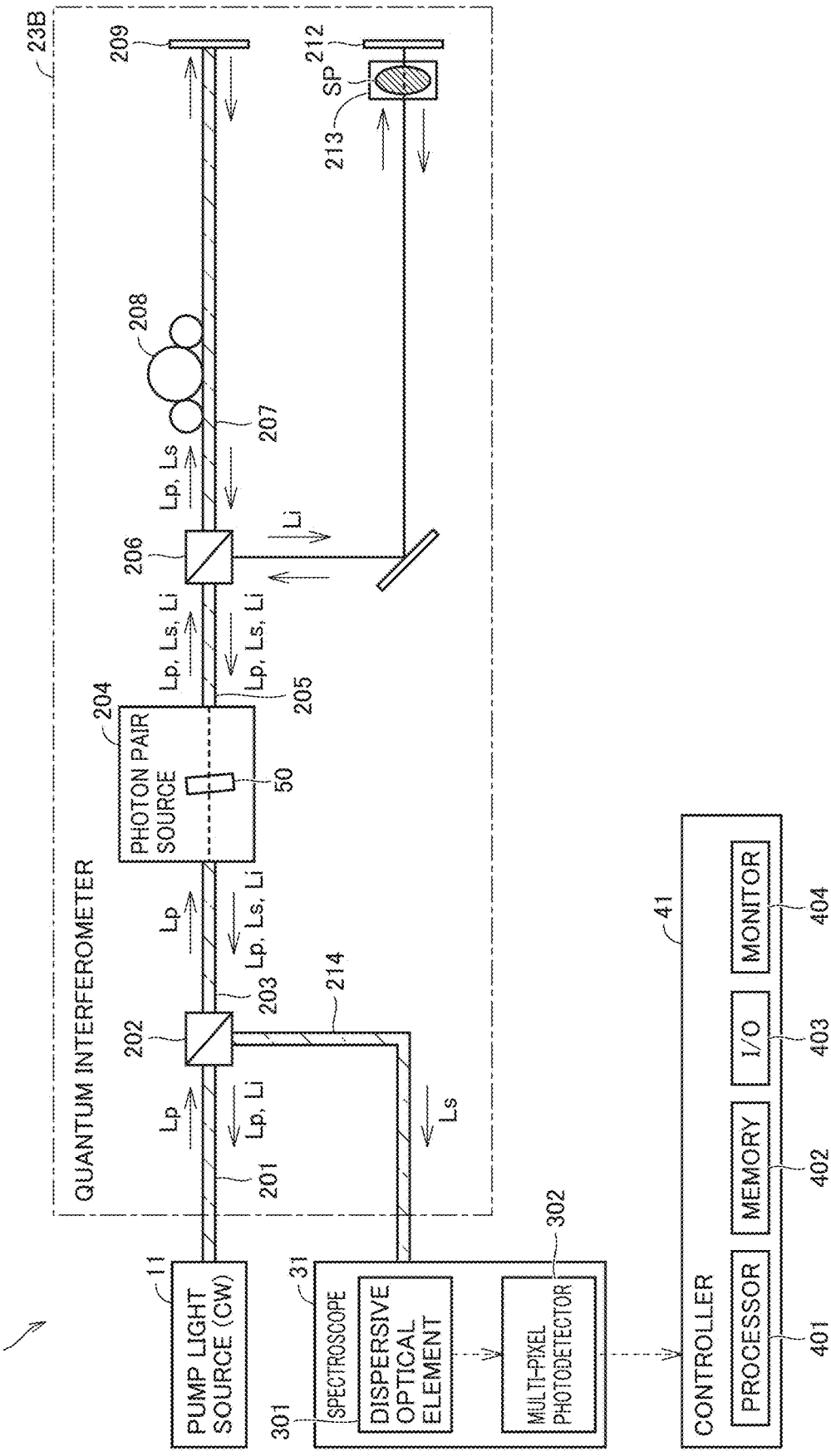
FIG. 16 is a diagram schematically showing the overall configuration of a quantum absorption spectroscopy system according to a second modification of the third embodiment.

FIG. 16 is a diagram schematically showing the overall configuration of a quantum absorption spectroscopy system according to a second modification of the third embodiment. A quantum absorption spectroscopy system 3B is different from quantum absorption spectroscopy system 3 (see FIG. 14) according to the third embodiment in that a quantum interferometer 23B is included instead of quantum interferometer 23. Quantum interferometer 23B is different from quantum interferometer 23 in that infrared SMF 218 and polarization controller 211 are not included.

In quantum absorption spectroscopy system 3B, optical fiber 203, wideband SMF 205, and visible SMF 207 are also provided. A quantum entanglement photon pair present in the single spatial mode is thereby coupled to the single mode fibers. The pumping optical path, the propagation path of the quantum entanglement photon pair before wavelength separation, and the signal optical path have been stabilized. Thus, the second modification of the third embodiment also enables measurement sensitivity of quantum absorption spectroscopy system 3B to be improved and robustness of quantum absorption spectroscopy system 3B to be improved.

Third Modification of Third Embodiment

Figure 17:
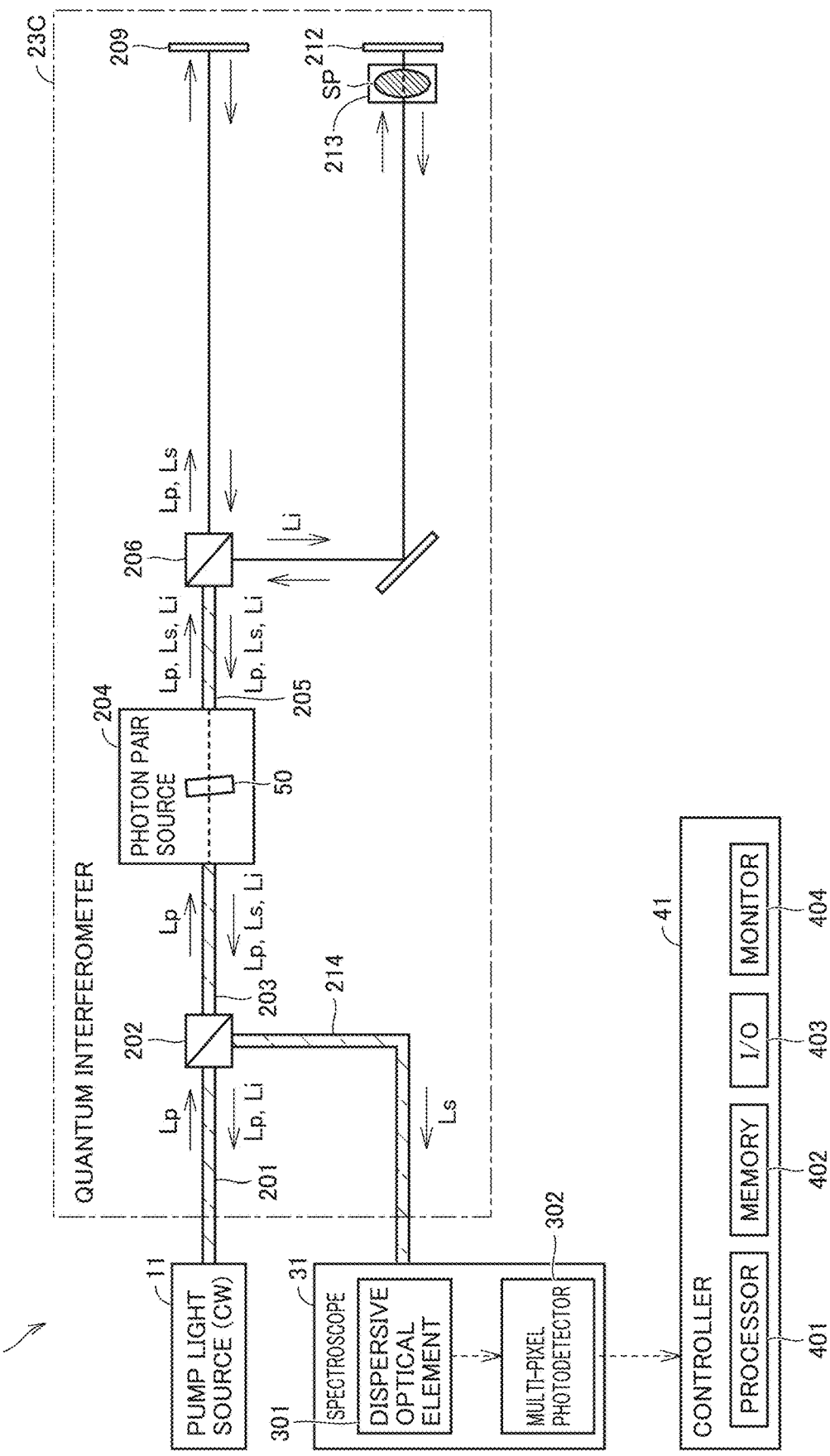
FIG. 17 is a diagram schematically showing the overall configuration of a quantum absorption spectroscopy system according to a third modification of the third embodiment.

FIG. 17 is a diagram schematically showing the overall configuration of a quantum absorption spectroscopy system according to a third modification of the third embodiment. A quantum absorption spectroscopy system 3C is different from quantum absorption spectroscopy system 3 (see FIG. 14) according to the third embodiment in that a quantum interferometer 23C is included instead of quantum interferometer 23. Quantum interferometer 23C is different from quantum interferometer 23 in that visible SMF 207, infrared SMF 218, and polarization controllers 208, 211 are not included.

In quantum absorption spectroscopy system 3C, optical fiber 203 and wideband SMF 205 are also provided. A quantum entanglement photon pair present in the single spatial mode is thereby coupled to the single mode fibers. The pumping optical path and the propagation path of a wideband quantum entanglement photon pair before separation have been stabilized. Thus, the third modification of the third embodiment also enables measurement sensitivity of quantum absorption spectroscopy system 3C to be improved and robustness of quantum absorption spectroscopy system 3C to be improved.

Fourth Modification of Third Embodiment

Figure 18:
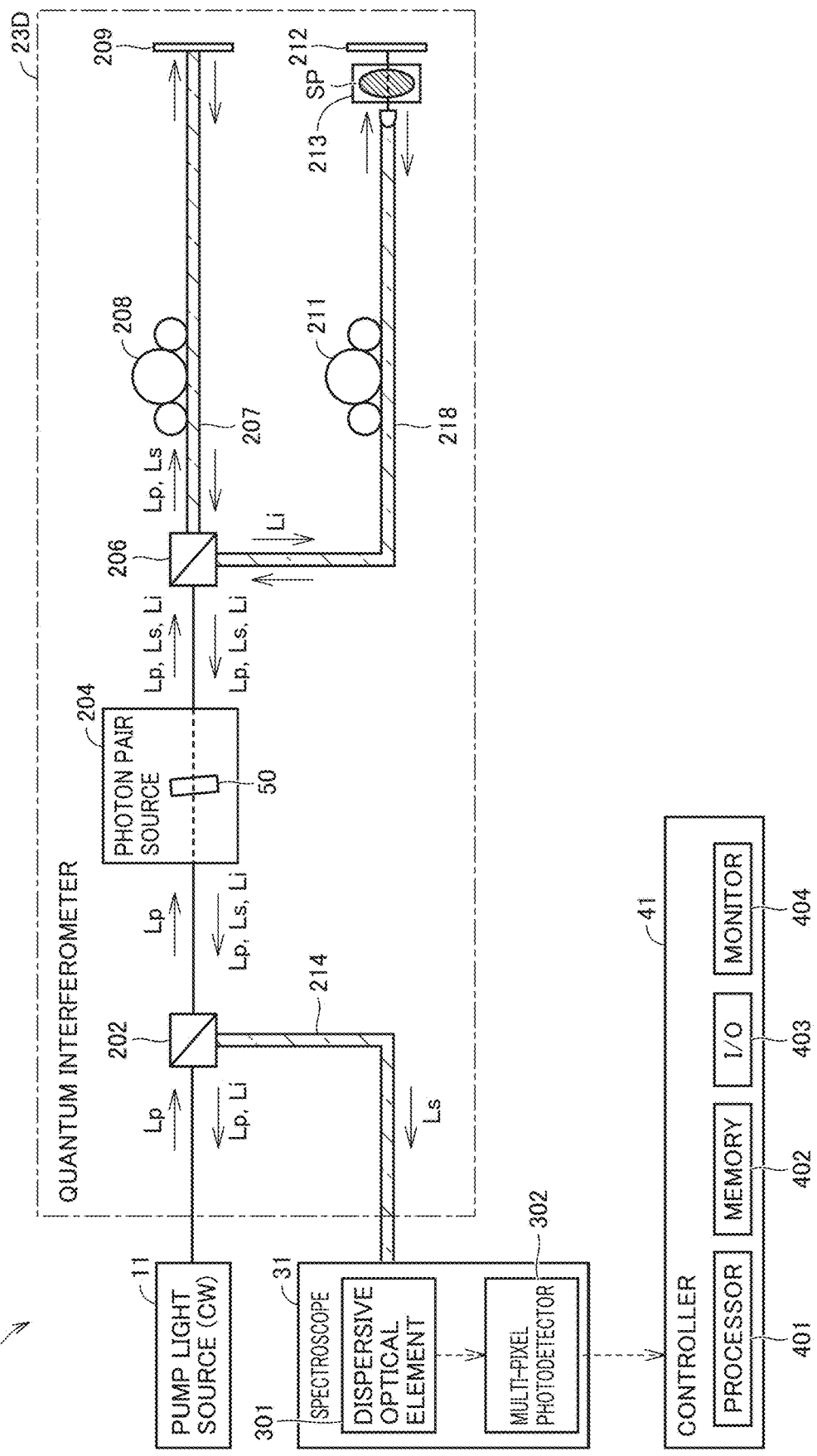
FIG. 18 is a diagram schematically showing the overall configuration of a quantum absorption spectroscopy system according to a fourth modification of the third embodiment.

FIG. 18 is a diagram schematically showing the overall configuration of a quantum absorption spectroscopy system according to a fourth modification of the third embodiment. A quantum absorption spectroscopy system 3D is different from quantum absorption spectroscopy system 3 (see FIG. 14) according to the third embodiment in that a quantum interferometer 23D is included instead of quantum interferometer 23. Quantum interferometer 23D is different from quantum interferometer 23 in that optical fibers 201, 203 and wideband SMF 205 are not included.

In quantum absorption spectroscopy system 3D, visible SMF 207 and infrared SMF 218 are also provided. A quantum entanglement photon pair present in the single spatial mode is thereby coupled to the single mode fibers, so that quantum interference having high visibility can be observed. The signal optical path and the idler optical path have been stabilized. Thus, the fourth modification of the third embodiment also enables measurement sensitivity of quantum absorption spectroscopy system 3D to be improved and robustness of quantum absorption spectroscopy system 3D to be improved.

In quantum absorption spectroscopy system 3D, the measurement sensitivity and robustness are improved by providing the signal optical path and idler optical path in the single mode fiber, while elements for adjusting the pumping optical path (such as dichroic splitter 202) are arranged in the free space. This can leave adjustment freedom for the pump light that directly affects the generation rate and the spatial mode of quantum entanglement photon pairs.

Fifth Modification of Third Embodiment

Figure 19:
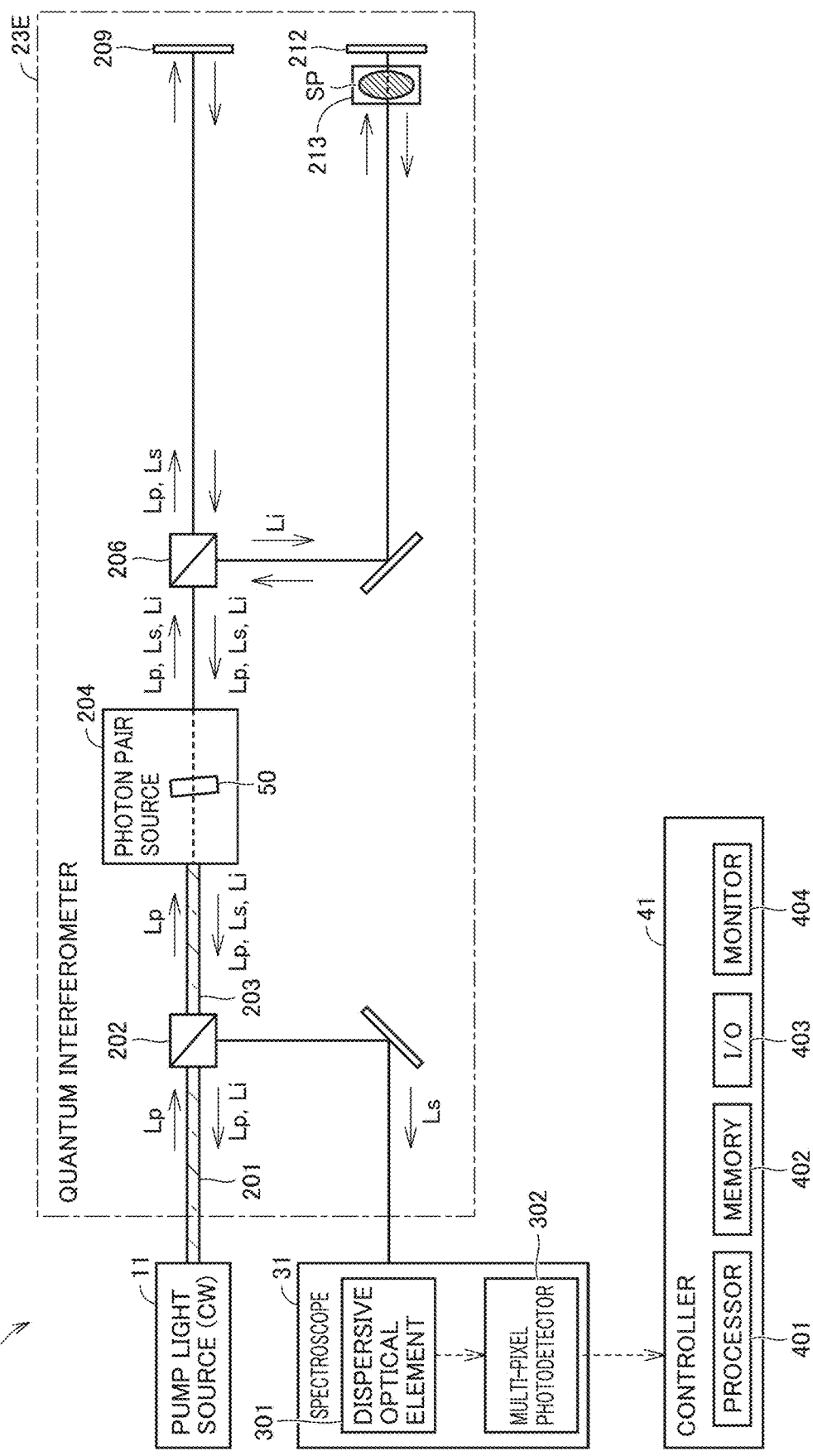
FIG. 19 is a diagram schematically showing the overall configuration of a quantum absorption spectroscopy system according to a fifth modification of the third embodiment.

FIG. 19 is a diagram schematically showing the overall configuration of a quantum absorption spectroscopy system according to a fifth modification of the third embodiment. A quantum absorption spectroscopy system 3E is different from quantum absorption spectroscopy system 3 (see FIG. 14) according to the third embodiment in that a quantum interferometer 23E is included instead of quantum interferometer 23. Quantum interferometer 23E is different from quantum interferometer 23 in that wideband SMF 205, visible SMF 207, and infrared SMF 218 are not included.

In quantum absorption spectroscopy system 3E, optical fibers 201 and 203 are also provided. The pumping optical path has thereby been stabilized. Then, the propagation paths (the signal optical path and the idler optical path) of the quantum entanglement photon pair generated by the irradiation with the pump light are also stabilized. A quantum entanglement photon pair present in the single spatial mode is coupled to the single mode fiber (optical fiber 203). Since this enables selective observation of only quantum interference in a specific spatial mode, visibility of quantum interference can be improved. Thus, the fifth modification of the third embodiment also enables measurement sensitivity of quantum absorption spectroscopy system 3E to be improved and robustness of quantum absorption spectroscopy system 3E to be improved.

In quantum absorption spectroscopy system 3E, pump light source 11 and photon pair source 204 are coupled with optical fibers 201 and 203, which enables part of the system for generating a quantum entanglement photon pair to be modularized. For example, optical fiber 201, dichroic splitter 202, and optical fiber 203 may be modularized, and photon pair source 204 may additionally be modularized.

Fourth Embodiment

In a fourth embodiment, a configuration that is based on the system configuration (see FIG. 1) of the first embodiment and measures infrared spectroscopy characteristics of the sample over a wider band will be described. In the fourth embodiment, the absorption spectroscopy characteristics of the sample are calculated by Fourier transform. Therefore, in a case where the infrared region is targeted for measurement, quantum absorption spectroscopy (QAS) in the fourth embodiment can be particularly called quantum Fourier transform infrared spectroscopy (Q-FTIR). However, the quantum absorption spectroscopy system according to the fourth embodiment also enables the absorption spectroscopy characteristics of the sample in the ultraviolet range or the visible range to be measured.

<System Configuration>

Figure 20:
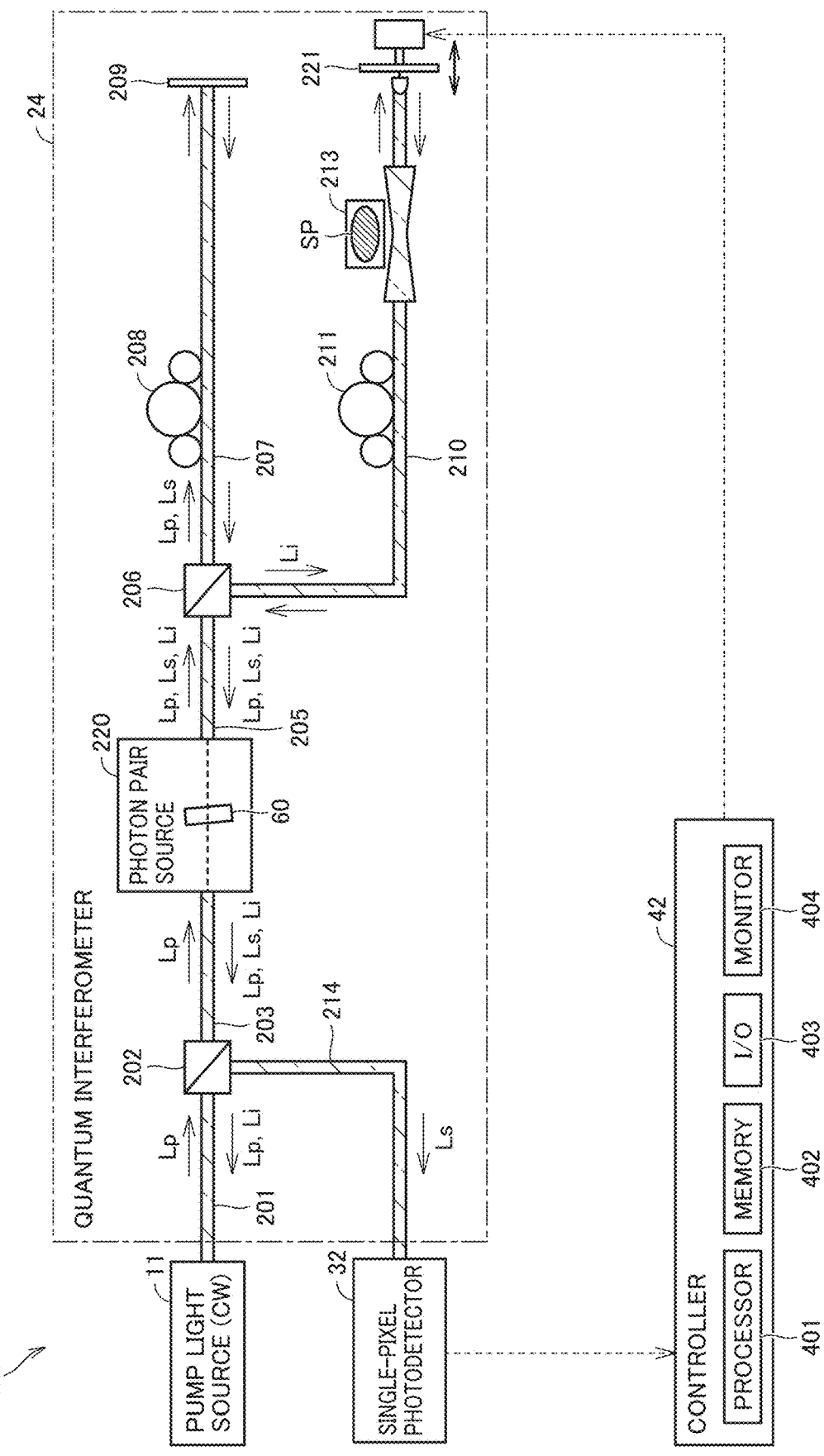
FIG. 20 is a diagram schematically showing the overall configuration of a quantum absorption spectroscopy system according to a fourth embodiment.

FIG. 20 is a diagram schematically showing the overall configuration of a quantum absorption spectroscopy system according to the fourth embodiment. A quantum absorption spectroscopy system 4 is different from quantum absorption spectroscopy system 1 (see FIG. 1) according to the first embodiment in that a quantum interferometer 24 is included instead of quantum interferometer 21, single-pixel photodetector 32 is included instead of spectroscope 31, and a controller 42 is included instead of controller 41. Quantum interferometer 24 is different from quantum interferometer 21 in that a photon pair source 220 is included instead of photon pair source 204 and in that a moving mirror 221 is included instead of mirror 212. Photon pair source 220 includes a quasi-phase-matched (QPM) device 60 instead of bulk-type nonlinear optical crystal 50.

Figure 21:
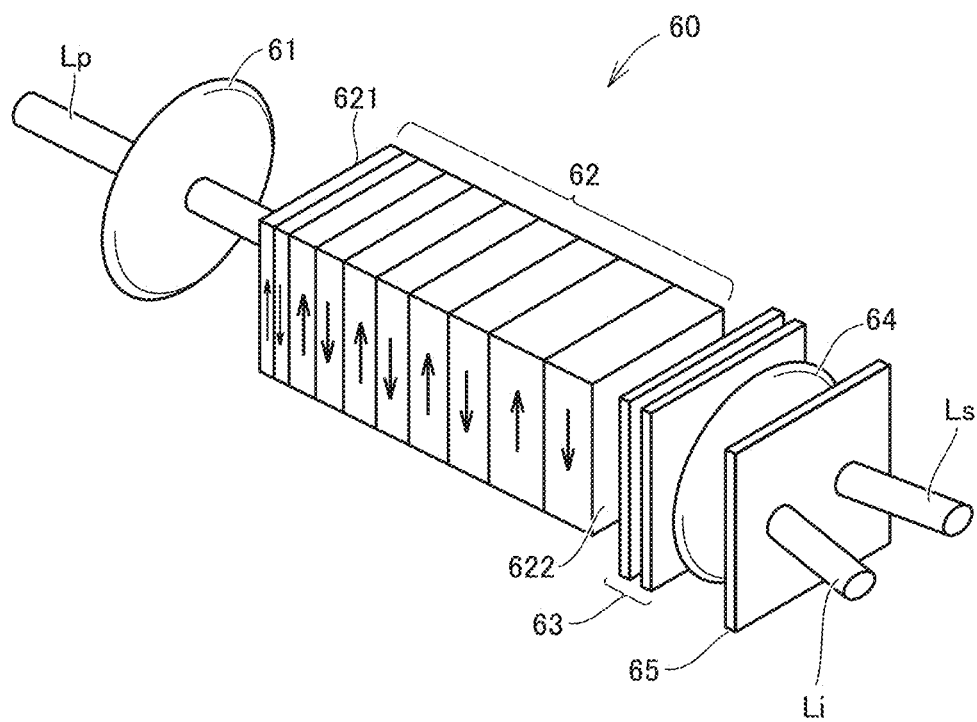
FIG. 21 is a diagram showing a configuration example of a QPM device.

FIG. 21 is a diagram showing a configuration example of QPM device 60. QPM device 60 includes a lens 61, a nonlinear optical crystal 62, a long pass filter 63, a lens 64, and a sharp cut filter 65.

The material of nonlinear optical crystal 62 is, for example, Mg doped stoichiometric lithium tantalate (also described as Mg:SLT). As the material of nonlinear optical crystal 62, gallium phosphide (GaP), gallium arsenide (GaAs), lithium tantalate (LiTaO$_3$), zinc selenide (ZnSe), or the like, for example, may be employed. The material of nonlinear optical crystal 62 may be an organic material. The material of nonlinear optical crystal 62 may be, for example, DAST (4-N,N-Dimethylamino-4'-N' methylstilbazolium tosylate), DLD164, a compound in which some functional groups of these compounds are substituted with other atoms or atomic groups, or the like.

Nonlinear optical crystal 62 has a periodical poling structure. Arrows in the drawing indicate spontaneous polarization directions. Nonlinear optical crystal 62 has a rectangular parallelepiped shape. When pump light is incident on one end (first end) 621 of end surfaces of nonlinear optical crystal 62 facing each other, a signal photon and an idler photon are emitted from the other end (second end) 622. Nonlinear optical crystal 62 has, for example, five poling structures (also called sections or segments) between first end 621 and second end 622. The typical number of divided sections provided in nonlinear optical crystal 62 is approximately several tens. As shown in the diagram, the sections gradually increase in width (poling period) from first end 621 toward second end 622.

By selecting an appropriate material for nonlinear optical crystal 62 and appropriately designing the number of divided sections and poling period, it is possible to generate idler light having a flat intensity distribution over the entire wide band. Note that QPM device 60 shown in FIG. 21 is a chirp-type element in which a poling period changes along an optical path. However, QPM device 60 may be a fan-type (fan-out structure) element in which the poling period changes into a fan shape. Alternatively, QPM device 60 may be of a ridge waveguide type (including the chirp-type) in which further improvement in generation efficiency of quantum entanglement photon pairs can be expected.

Each of long pass filter 63 and sharp cut filter 65 cuts light having a wavelength shorter than a specific wavelength in the pump light. Long pass filter 63 and sharp cut filter 65 may be omitted.

It is not essential to employ photon pair source 220 including QPM device 60 in the fourth embodiment. Quantum absorption spectroscopy system 4 may include photon pair source 204 including nonlinear optical crystal 50 similarly to the first to third embodiments.

Referring back to FIG. 20, moving mirror 221 is movable in the propagation direction of the idler light. Specifically, moving mirror 221 is provided with a drive device. The drive device is an electric actuator controlled by controller 42, and is, for example, a motor drive device (such as a servo motor or a stepping motor) that is mechanically displaced in accordance with a control command from controller 42. The drive device may be a piezoelectric element (piezo element) that is displaced according to an applied voltage from controller 42. The idler optical path can be swept by periodically changing the position of moving mirror 221 (reciprocating moving mirror 221) using the drive device.

Moving mirror 221 is an example of a configuration for changing the phase (more particularly, an effective optical path length) of one photon of the signal photon and the idler photon with respect to the phase of the other photon. Although moving mirror 221 changes the optical path length of the idler optical path, the optical path length of the signal optical path may be changed by replacing mirror 209 on the signal optical path by the moving mirror. Further, a phase modulator (not shown) such as an electro-optic modulator (EOM) may be employed instead of or in addition to moving mirror 221. For example, after the optical path length is roughly changed using moving mirror 221, a fine change in optical path length can also be achieved using the phase modulator. Moving mirror 221 and the phase modulator are equivalent to a "phase converter" according to the present disclosure.

It is also possible to use reflected light instead of the transmission method in which the idler light is transmitted through the sample. For example, the attenuated total reflection (ATR) may be applied to quantum absorption spectroscopy system 4, and an ATR unit may be employed.

Figure 22:
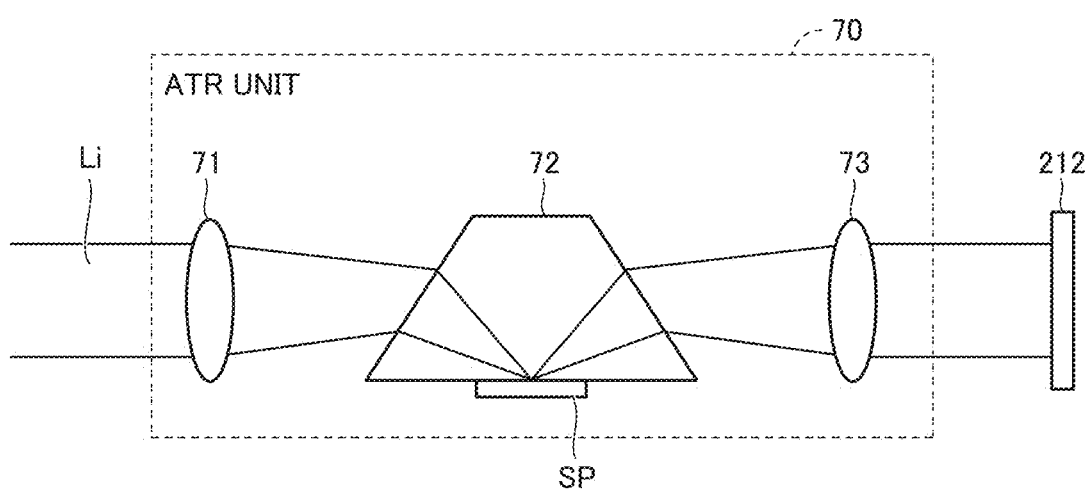
FIG. 22 is a diagram showing a configuration example of an ATR unit.

FIG. 22 is a diagram showing a configuration example of an ATR unit. An ATR unit 70 includes a lens 71, a prism 72, and a lens 73. Lens 71, prism 72, and lens 73 are arranged in this order in the propagation direction of an idler photon.

Prism 72 has a high refractive index, and comes into contact with the surface of a sample. An idler photon incident from lens 71 into prism 72 is totally reflected at the interface between prism 72 and the sample. At this time, since the idler photon (evanescent waves) oozing out to the sample side is absorbed by the surface of the sample, the infrared absorption spectroscopy characteristics of the surface of the sample can be measured by detecting totally reflected light.

In a case where microscopic irregularities are present on the surface of the sample, a plurality of modes may occur as the idler photon is scattered and/or reflected by the surface of the sample in a typical transmission method. As a result, the measurement accuracy of the infrared absorption spectroscopy characteristics of the sample may be reduced due to a decrease in signal intensity and an increase in noise. On the other hand, since prism 72 comes into contact with the surface of the sample in the ATR, the above-described problem is less likely to occur even if the microscopic irregularities are present on the surface of the sample. Therefore, the infrared absorption spectroscopy characteristics of the sample can be measured with high accuracy.

In the ATR, it is necessary to adjust the optical axis of idler light such that the idler light is incident on one end of the prism and the idler light is emitted from the other end of the prism toward the subsequent mirror. In a case where the idler optical path is swept by the reciprocation of moving mirror 221 arranged on the idler optical path, the optical axis of the idler light may periodically change with the reciprocation of moving mirror 221. It is not easy to construct quantum interferometer 24 such that the optical axis of the idler light is always maintained at an appropriate position even during the sweeping of the idler optical path. Therefore, in a case of replacing sample holder 213 by ATR unit 70 although not shown, it is desirable to replace mirror 209 arranged on the signal optical path by a moving mirror to sweep the signal optical path. This can reduce the difficulty of constructing quantum interferometer 24.

<Arithmetic Processing by Controller>

In the case of using spectroscope 31 as in the first embodiment, signal lights having different frequencies are detected respectively for a plurality of pixels included in multi-pixel photodetector 302. In other words, in each pixel of multi-pixel photodetector 302, signal light divided into a single color is detected. On the other hand, quantum absorption spectroscopy system 4 according to the fourth embodiment includes single-pixel photodetector 32 instead of spectroscope 31. The signal photon is guided to single-pixel photodetector 32 without being spatially divided, and signal light including all frequency components is detected by one pixel. Even in such a case where the signal light includes all frequency components, controller 42 can calculate the infrared absorption spectroscopy characteristics (the Fourier spectrum, the complex transmittance spectrum, and the infrared absorption spectrum of the sample) of the sample based on a detection signal from single-pixel photodetector 32 by executing the following arithmetic processing.

Figure 23:
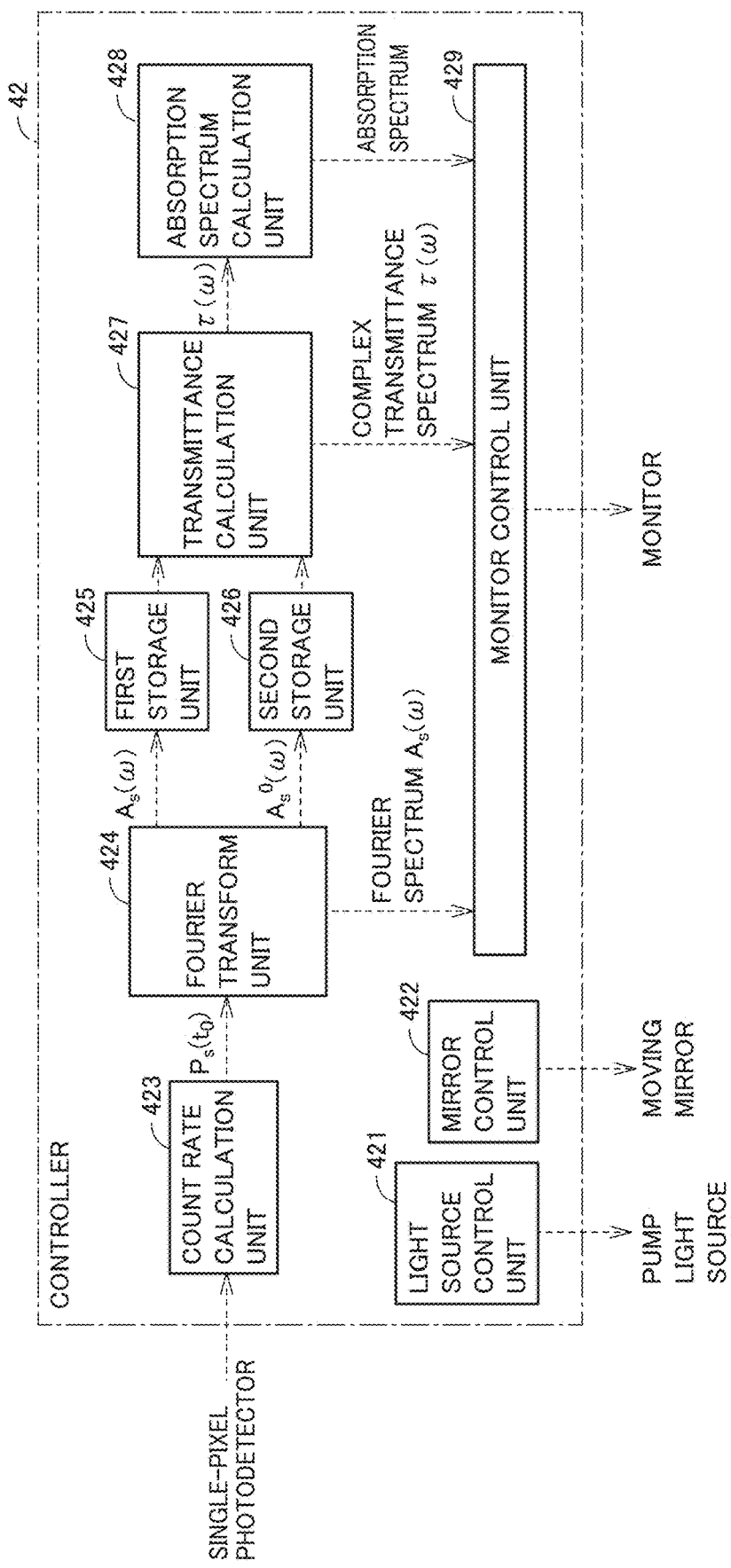
FIG. 23 is a functional block diagram for more particularly describing arithmetic processing performed by a controller.

FIG. 23 is a functional block diagram for more particularly describing the arithmetic processing performed by controller 42. Controller 42 includes a light source control unit 421, a mirror control unit 422, a count rate calculation unit 423, a Fourier transform unit 424, a first storage unit 425, a second storage unit 426, a transmittance calculation unit 427, an absorption spectrum calculation unit 428, and a monitor control unit 429.

Light source control unit 421 controls light output (laser power) of pump light source 11. The laser power during the measurement by quantum absorption spectroscopy system 4 is basically kept constant.

Mirror control unit 422 controls the sweeping (reciprocating motion) of moving mirror 221. When the position of moving mirror 221 changes, the idler optical path length changes, so that the propagation time (hereinafter, abbreviated as an "idler propagation time") $t_0$ of the idler light changes. Therefore, by reciprocating moving mirror 221, the detection signal of the signal light from single-pixel photodetector 32 is acquired as a time waveform of idler propagation time $t_0$.

Count rate calculation unit 423 calculates a signal photon count rate $P_s$ as the function of idler propagation time $t_0$ based on the detection signal of the signal light from single-pixel photodetector 32. Signal photon count rate $P_s(t_0)$ is the number of counts of signal photons per unit time. The calculation results of signal photon count rate $P_s(t_0)$ are output to Fourier transform unit 424.

Fourier transform unit 424 performs Fourier transform on signal photon count rate $P_s(t_0)$. In quantum absorption spectroscopy system 4, signal photon count rate $P_s(t_0)$ is acquired in both a state where the sample is arranged in sample holder 213 and a state where the sample is not arranged in sample holder 213. A Fourier spectrum obtained by performing Fourier transform on signal photon count rate $P_s(t_0)$ acquired in the state where the sample is arranged in sample holder 213 is described as "$A_s(\omega)$". On the other hand, a Fourier spectrum obtained by performing Fourier transform on signal photon count rate $P_s(t_0)$ acquired in the state where the sample is not arranged in sample holder 213 is described as "$A_s^0(\omega)$". Fourier transform unit 424 outputs Fourier spectrum $A_s(\omega)$ to first storage unit 425 and monitor control unit 429, and outputs Fourier spectrum $A_s^0(\omega)$ to second storage unit 426. Note that Fourier spectrum $A_s^0(\omega)$ is equivalent to a "reference Fourier spectrum" according to the present disclosure.

First storage unit 425 non-volatilely stores Fourier spectrum $A_s(\omega)$ obtained in the state where the sample is arranged in sample holder 213. Second storage unit 426 non-volatilely stores Fourier spectrum $A_s(\omega)$ obtained in the state where the sample is not arranged in sample holder 213. The stored Fourier spectrum ($A_s(\omega)$ or $A_s^0(\omega)$) is appropriately read by transmittance calculation unit 427.

Transmittance calculation unit 427 calculates a complex transmittance spectrum $\tau(\omega)$ of the sample based on Fourier spectrum $A_s(\omega)$ and Fourier spectrum $A_s^0(\omega)$. Transmittance calculation unit 427 outputs a calculation result of complex transmittance spectrum $\tau(\omega)$ to absorption spectrum calculation unit 428 and monitor control unit 429.

Absorption spectrum calculation unit 428 calculates an infrared absorption spectrum of the sample based on complex transmittance spectrum $\tau(\omega)$ of the sample. Absorption spectrum calculation unit 428 outputs a calculation result of the infrared absorption spectrum to monitor control unit 429.

Monitor control unit 429 causes monitor 404 to display the calculation results (Fourier spectrum $A_s(\omega)$, complex transmittance spectrum $\tau(\omega)$, and the infrared absorption spectrum of the sample) obtained by controller 42.

Next, functions of some blocks will be described in detail. Hereinafter, a parameter denoted by "signal" is a parameter related to the signal photon. A parameter denoted by "idler" is a parameter related to the idler photon.

First, arithmetic processing performed by count rate calculation unit 423 will be described. A state vector $|\Psi\rangle$ obtained by superimposing two events (the first and second physical processes) in which a quantum entangled photon pair is generated by QPM device 60 is described as the following formula (1).

[Expression 1]

$$|\Psi\rangle = |\psi\rangle_1 + |\psi\rangle_2 \qquad (1)$$
$$= |vac\rangle + \sqrt{\eta} \int\int d\omega_s d\omega_i F(\omega_s, \omega_i) a_{s1}^\dagger a_{i1,in}^\dagger |vac\rangle +$$
$$\sqrt{\eta} e^{-i\varphi_p} \int\int d\omega_s d\omega_i F(\omega_s, \omega_i) a_{s2}^\dagger a_{i2}^\dagger |vac\rangle$$

In formula (1), a vacuum state vector is represented by $|vac\rangle$. An SPDC generation efficiency is represented by $\eta$. A signal frequency is represented by $\omega_s$, and an idler frequency is represented by $\omega_i$. A two-photon field amplitude is represented by $F(\omega_s, \omega_i)$. Signal generation operators in the first and second physical processes are respectively represented by $a_{s1}^+$ and $a_{s2}^+$. An idler generation operator in the first physical process is represented by $a_{i1,in}^+$ or $a_{i1,out}^+$. When the idler light generated in the first physical process is transmitted through the sample arranged on the idler optical path, the idler light before transmission through the sample and the idler light after transmission through the sample are distinguished by adding a subscript in to the generation operator corresponding to the idler light before transmission through the sample and adding a subscript out to the generation operator corresponding to the idler light after transmission through the sample. An idler generation operator in the second physical process is represented by $a_{i2}^+$. A phase delay obtained by the pump light in correspondence to the optical path difference of the pump light between the first physical process and the second physical process is represented by $\phi_p$.

When optical loss due to the sample arranged on the idler optical path is evaluated according to a beam splitter model, an idler extinction operator $a_{i1,out}$ after transmission through the sample is represented as the following formula (2).

[Expression 2]

$$a_{i1,out} \tau^2 a_{i1,in} + r\tau a_{v1} + r a_{v2} \quad (2)$$

In formula (2), the complex transmittance (complex transmission amplitude) of the sample is represented by $\tau$, and a complex reflectance (complex reflection amplitude) of the sample is represented by r. In a beam splitter model representing the j-th (j=1, 2) transmission through the sample, a vacuum field incident from a port different from a port to which the idler photon is input is represented by $a_{vj}$.

The mode of the signal light generated in the first physical process is adjusted to spatially coincide with the mode of the signal light generated in the second physical process. The mode of the idler light generated in the first physical process is adjusted to spatially coincide with the mode of the idler light generated in the second physical process. These modes can be represented by the same generation/extinction operator except for a change in phase due to propagation as shown in the following formulae (3) and (4).

[Expression 3]

$$a_{s1} = e^{-i\omega_s t_1} a_{s2} \quad (3)$$

$$a_{i1,out} = e^{-\omega_i t_0} a_{i2} \quad (4)$$

In formula (3) and formula (4), a propagation time until the signal light generated in the first physical process reaches QPM device 60 again is represented by $t_1$. Similarly, a propagation time until the idler light generated in the first physical process reaches QPM device 60 again in the situation where the sample is not arranged on the idler optical path is represented by $t_0$.

Next, an electric field $E_s^{(+)}(t)$ of the signal light in single-pixel photodetector 32 is represented by the following formula (5).

[Expression 4]

$$E_s^{(+)}(t)|\Psi\rangle \propto \int a_{s2}(\omega) e^{-i\omega t} d\omega |\Psi\rangle \quad (5)$$

Signal photon count rate $P_s$ is described as the following formula (6) using state vector $|\Psi\rangle$ shown in formula (1).

[Expression 5]

$$P_s = \langle \Psi | E_s^{(-)} E_s^{(+)} | \Psi \rangle \quad (6)$$

The following formula (7) is derived by substituting formulae (1) to (4) into formula (5). Formula (7) represents a time waveform of the quantum interference (quantum beat) between the first and second physical processes of generating the quantum entangled photon pair.

[Expression 6]

$$E_s^{(+)}(t)|\Psi\rangle \propto \iint d\omega_s d\omega_i F(\omega_s, \omega_i) \quad (7)$$
$$\left[ e^{-i\omega_s t + i(\varphi_p - \omega_i t_0)} (\tau^{*2} a_{i1,in}^\dagger + r\tau a_{v1}^\dagger + r a_{v2}^\dagger) + e^{-i\omega_s(t-t_1)} a_{i1,in}^\dagger \right] |vac\rangle$$

Here, a signal frequency $\omega_s$ is redefined using detuning $\Omega$ from a center frequency $\omega_{s0}$. That is, the signal frequency $\omega_s$ is represented as $\omega_s = \omega_{s0} - \Omega$. Similarly, an idler frequency $\omega_i$ is represented as $\omega_i = \omega_{i0} + \Omega$ using detuning $\Omega$ from a center frequency $\omega_{i0}$. Then, from the above formulae (6) and (7), signal photon count rate $P_s$ is transformed as in the following formula (8).

[Expression 7]

$$P_s \propto \int d\Omega |F(\Omega)|^2 (|\tau|^2 |r|^2 + |r|^2 + |e^{-i(\omega_{s0} - \Omega)(t-t_1)} + \tau^{*2} e^{-i((\omega_{s0} - \Omega)t - \varphi_p + (\omega_{i0} + \Omega)t_0)}|^2) = \int d\Omega |F(\Omega)|^2 (2 + \tau^{*2} e^{-i\Omega(t_0 - t_1)} e^{i(\varphi_p - \omega_{s0} t_1 - \omega_{i0} t_0)} + c.c.) \quad (8)$$

A configuration in which dispersive optical element 301 is arranged at a stage preceding multi-pixel photodetector 302 as in the first embodiment is also conceivable (see FIG. 1). By arranging dispersive optical element 301, the signal photon reaching each of the plurality of pixels included in multi-pixel photodetector 302 is limited in advance to a signal photon in a specific wavelength range, and the light intensity of the signal photon for each wavelength is measured. However, in general, a device including a spectroscope may be increased in size or price. Wavelength scanning of the spectroscope requires time, which may be an obstacle in shortening the measurement time.

In contrast, in the fourth embodiment, signal photons in the entire wavelength range generated by QPM device 60 are detected by single-pixel photodetector 32 without passing through dispersive optical element 301. This is based on the idea of not limiting the frequency band in which frequency (signal frequency) $\omega_s$ of the signal photon detected by single-pixel photodetector 32 is included, and including all possibilities when signal photon count rate $P_s$ is obtained. This idea is also expressed by integrating a frequency component (detuning $\Omega$) in the above formula (8).

In the fourth embodiment, in consideration of the frequency dependence of complex transmittance $\tau$ and complex reflectance r of the sample, both complex transmittance $\tau$ and complex reflectance r are functions of idler frequency $\omega_i$ ($\tau \to \tau(\omega_i)$, $r \to r(\omega_i)$). In this case, the following formula (9) is obtained from formula (8).

[Expression 8]

$$P_s(t_0) \propto \quad (9)$$
$$\int d\Omega |F(\Omega)|^2 \left( 2 + (\tau^*(\omega_{i0} + \Omega))^2 e^{(-i\Omega(t_0 - t_1))} e^{i(\varphi_p - \omega_{s0} t_1 - \omega_{i0} t_0)} + c.c. \right) =$$
$$2 + e^{i(\varphi_p - \omega_{s0} t_1)} \int d\Omega |F(\Omega)|^2 \left( (\tau^*(\omega_{i0} + \Omega))^2 e^{-i\Omega(t_0 - t_1) - i\omega_{i0} t_0} \right) + c.c.$$

In formula (9), the first term (constant term of 2) represents an offset component of signal photon count rate $P_s$. The second term (integral term) and the third term (complex conjugate term) represent a quantum interference component of signal photon count rate $P_s$. Since the optical path length of the signal light in the two physical processes of generating the quantum entangled photon pair is constant, a propagation time $t_1$ is a fixed value. The following formula (10) representing a normalization condition of the two-photon field amplitude is established. Therefore, it can be seen from formula (9) that signal photon count rate $P_s$ is a value depending on idler propagation time $t_0$. Thus, signal photon count rate $P_s(t_0)$ with respect to various idler propagation times $t_0$ can be measured by periodically changing the idler optical path length (sweeping the idler optical path) in accordance with the reciprocating motion of moving mirror 221. A signal in accordance with signal photon count rate $P_s$ measured in this manner is also referred to as a "quantum interference signal" (or a quantum interference waveform).

[Expression 9]

$$\int d\Omega |F(\Omega)|^2 = 1 \quad (10)$$

Next, arithmetic processing performed by Fourier transform unit 424 will be described. Fourier transform unit 424 performs Fourier transform on the quantum interference signal (see the above formula (9)) measured while changing the idler optical path length. Thus, Fourier spectrum $A_s(\omega)$ is obtained as in the following formula (11), and information for each wavelength of infrared light absorbed by the sample is reproduced. Note that in the Fourier integral shown in formula (11), an integral term of a constant that gives a DC component and a complex conjugate term that gives a $-\omega$ component are omitted.

[Expression 10]

$$\begin{aligned}A_s(\omega) &= \frac{1}{2\pi}\int P_s(t_0)e^{i\omega t_0}dt_0 \propto e^{i(\varphi_p - \omega_{s0}t_1)}\int\int dt_0 d\Omega |F(\Omega)|^2 \quad (11)\\ &\quad \left((\tau^*(\omega_{i0}+\Omega))^2 e^{-i\Omega(t_0-t_1)-i\omega_{i0}t_0}e^{i\omega t_0}\right)\\ &= e^{i(\varphi_p-\omega_{s0}t_1)}\int\int dt_0 d\Omega |F(\Omega)|^2\left((\tau^*(\omega_{i0}+\Omega))^2 e^{-i(\Omega-(\omega-\omega_{i0}))t_0}\right)\\ &= e^{i(\varphi_p-\omega_{s0}t_1)}\int d\Omega |F(\Omega)|^2\left((\tau^*(\omega_{i0}+\Omega))^2 e^{i\Omega t_1}\delta(\Omega-(\omega-\omega_{i0}))\right)\\ &= e^{i(\varphi_p-\omega_{s0}t_1)}|F(\omega-\omega_{i0})|^2(\tau^*(\omega))^2 e^{i(\omega-\omega_{i0})t_1}\\ &= e^{i(\varphi_p-(\omega_{s0}-\omega_{i0})t_1))}|F(\omega-\omega_{i0})|^2(\tau^*(\omega))^2 e^{-i\omega t_1}\end{aligned}$$

Subsequently, arithmetic processing performed by transmittance calculation unit 427 will be described. As described above, the Fourier spectrum when the sample is arranged on the idler optical path is described as $A_s(\omega)$, and the Fourier spectrum when the sample is not arranged on the idler optical path is described as $A_s^0(\omega)$, thereby distinguishing both the Fourier spectra from each other. Fourier spectrum $A_s^0(\omega)$ is equivalent to setting the complex transmittance $\tau$ of the sample at 1 in the above formula (11). Therefore, when the difference in the Fourier spectrum depending on the presence or absence of the sample, more specifically, the amplitude ratio of Fourier spectrum $A_s(\omega)$ to Fourier spectrum $A_s^0(\omega)$ is calculated, the following formula (12) is derived.

[Expression 11]

$$A_S(\omega)/A_S^0(\omega)=(\tau^*(\omega))^2 \quad (12)$$

From formula (12), it is understood that the frequency dependence of the complex transmittance $\tau$ of the sample (that is, complex transmittance spectrum $\tau(\omega)$) is obtained by performing two measurements with and without the sample and taking the ratio of the two Fourier spectra.

Finally, arithmetic processing performed by absorption spectrum calculation unit 428 will be described. Absorption spectrum calculation unit 428 calculates the (intensity) absorption spectrum of the sample in the infrared range by calculating the square of the absolute value of complex transmittance spectrum $\tau(\omega)$.

As described above, in the fourth embodiment, infrared absorption spectroscopy in a wide band can be achieved merely by performing Fourier transform on single signal photon count rate $P_s(t_0)$ acquired using single-pixel photodetector 32 to calculate Fourier spectrum $A_s(\omega)$. According to the fourth embodiment, it is possible to measure the complex transmittance spectrum of the sample for a wide band by one light detection without requiring light detection for each wavelength in principle. This effect is particularly remarkable when QPM device 60 adaptable to a wider bandwidth is employed.

<Measurement Flow>

Figure 24:
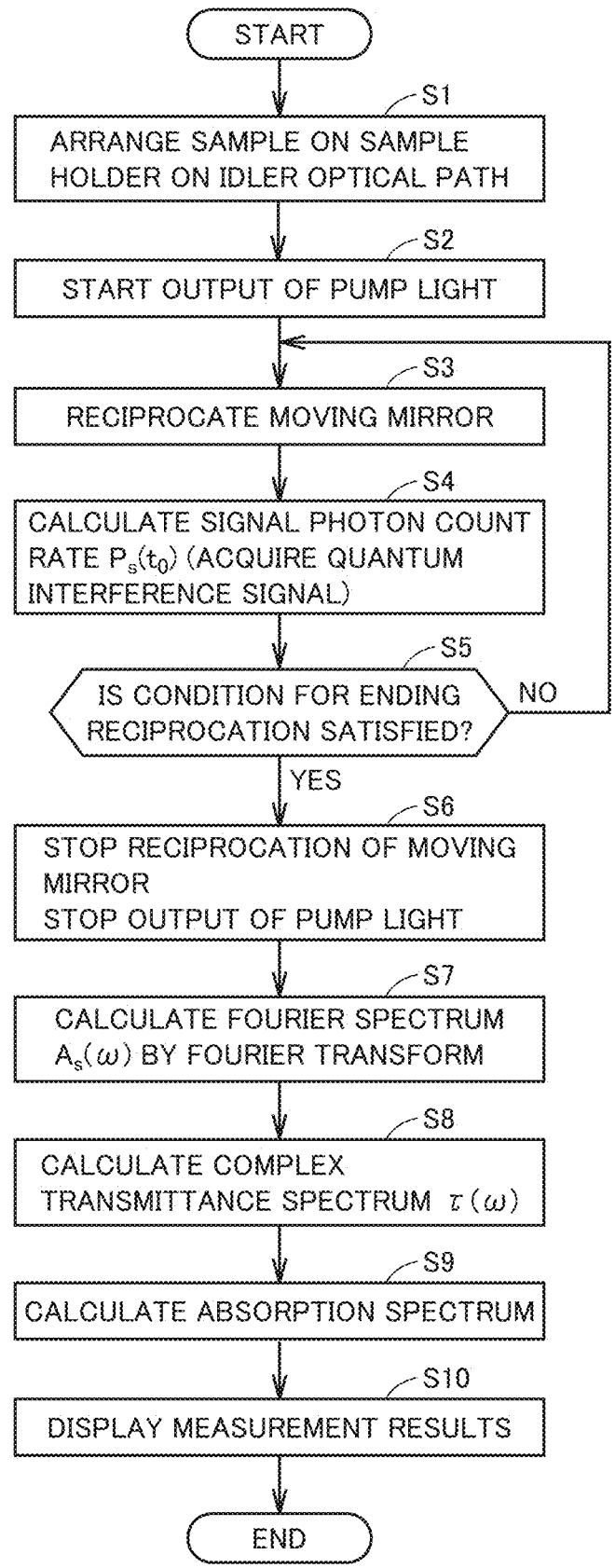
FIG. 24 is a flowchart showing a processing procedure of a quantum absorption spectroscopy method in the fourth embodiment.

FIG. 24 is a flowchart showing a processing procedure of a quantum absorption spectroscopy method in the fourth embodiment. This flowchart is called from a main routine and executed, for example, when an input device (not shown) such as an operation button receives an operation of an operator. Each step is basically achieved by software processing by controller 42, but may be achieved by hardware processing by an electronic circuit arranged in controller 42. Hereinafter, a step is abbreviated as "S".

In S1, a sample is installed in sample holder 213 arranged on an idler optical path. The sample is usually installed by the operator. However, the installation can also be automated by providing a feed device (not shown) that conveys the sample.

In S2, controller 42 controls pump light source 11 to start output of pump light.

In S3, controller 42 controls the drive device provided for moving mirror 221 so as to start or continue a high-speed reciprocating motion. Generally, the signal-noise ratio of the infrared absorption spectrum can be improved by integrating light detection results. Therefore, in S3, moving mirror 221 reciprocates several tens of times per second in a range of sub millimeters (for example, several tens of micrometers) to several centimeters (for example, a maximum of 5 cm). However, in such a case where the integration is not required or high speed performance is required such as when acquiring the time change of the infrared absorption spectrum, the reciprocating motion may be performed only once.

In S4, controller 42 calculates signal photon count rate $P_s(t_0)$ based on a detection signal from single-pixel photodetector 32.

In S5, controller 42 determines whether a condition for ending the reciprocating motion of moving mirror 221 is satisfied. For example, controller 42 can determine that the end condition is satisfied when signal photon count rate $P_s(t_0)$ is calculated while reciprocating moving mirror 221 by a specified number of times or for a specified time. When the end condition is not satisfied (NO in S5), controller 42 returns the process to S3. The processing of S3 and S4 is thus repeated until data for the specified number of times or the specified time is acquired. When the end condition is satisfied (YES in S5), controller 42 advances the process to S6.

In S6, controller 42 controls pump light source 11 to stop the output of the pump light. Controller 42 also controls the drive device of moving mirror 221 so as to stop the reciprocating motion of moving mirror 221.

In S7, controller 42 calculates Fourier spectrum $A_s(\omega)$ by performing Fourier transform on signal photon count rate $P_s(t_0)$ in the state where the sample is arranged on the idler optical path.

Although not shown, Fourier spectrum $A_s^0(\omega)$ has been acquired by similar processing (what is called background measurement) in the state where the sample is not arranged on the idler optical path before the series of processing of S1 to S7 are executed. In S8, controller 42 calculates complex transmittance spectrum $\tau(\omega)$ of the sample based on Fourier spectrum $A_s(\omega)$ calculated by the series of processing and Fourier spectrum $A_s^0(\omega)$ acquired in advance. Note that in a case where the background measurement has not been performed, Fourier spectrum $A_s^0(\omega)$ can be acquired by executing processing similar to the processing of S1 to S7 without arranging the sample.

In S8, controller 42 calculates complex transmittance spectrum τ(ω) of the sample by calculating a ratio between Fourier spectrum $A_s^0(\omega)$ (reference Fourier spectrum) in the state where the sample is not arranged on the idler optical path and Fourier spectrum $A_s(\omega)$ in the state where the sample is arranged on the idler optical path.

In S9, controller 42 calculates the infrared absorption spectrum of the sample by calculating the square of the absolute value of complex transmittance spectrum τ(ω) of the sample.

In S10, controller 42 causes monitor 404 to display the measurement results of the infrared absorption spectroscopy characteristics of the sample (Fourier spectrum $A_s(\omega)$ of the sample, complex transmittance spectrum τ(ω) of the sample, and the infrared absorption spectrum of the sample) obtained by the processing of S1 to S9.

As described above, in the fourth embodiment, all the signal lights emitted from quantum interferometer 24 are detected by single-pixel photodetector 32 without being spectrally dispersed (wavelength-resolved or frequency-resolved) by dispersive optical element 301 or removed by a filter. Then, Fourier spectrum $A_s(\omega)$ is calculated by Fourier transform of the quantum interference signal. Since information on all bandwidths is reflected in Fourier spectrum $A_s(\omega)$, infrared absorption spectroscopy in a wide band can be performed. Furthermore, phase information on the sample can be acquired from the difference in Fourier spectrum depending on the presence or absence of the sample arranged on the idler optical path.

Modification of Fourth Embodiment

In the fourth embodiment, the configuration in which the quantum Fourier transform infrared spectroscopy (Q-FTIR) is applied to quantum absorption spectroscopy system 1 (see FIG. 1) according to the first embodiment as a base has been described. However, the Q-FTIR can also be applied to the quantum absorption spectroscopy systems according to the other embodiments already described.

FIG. 25 is a diagram schematically showing the overall configuration of a quantum absorption spectroscopy system according to a modification of the fourth embodiment. A quantum absorption spectroscopy system 4A is different from quantum absorption spectroscopy system 2 (see FIG. 20) according to the fourth embodiment in that a quantum interferometer 24A is included instead of quantum interferometer 24. Quantum interferometer 24A is different from quantum interferometer 24 in that infrared SMF 218 not provided with taper waist portion 210C is included instead of infrared SMF 210 provided with taper waist portion 210C (see FIG. 4), similarly to the third embodiment.

As described above, the Q-FTIR can also be applied to the quantum absorption spectroscopy system according to the third embodiment. Although the detailed description will not be repeated, the Q-FTIR may be applied to the quantum absorption spectroscopy systems according to the first and second modifications of the first embodiment or the first to fifth modifications of the third embodiment. The photodetector that can be employed by the quantum absorption spectroscopy system to which the Q-FTIR is applied is not limited to a single-pixel photodetector. The Q-FTIR can also be applied to a system configuration including a multi-pixel photodetector.

It should be understood that the embodiments disclosed herein are illustrative and non-restrictive in all respects. The scope of the present disclosure is defined by the claims, rather than the embodiments described above, and is intended to include any changes within the meaning and scope equivalent to the claims.

REFERENCE SIGNS LIST

1, 1A, 1B, 2, 2A, 2B, 3, 3A to 3E, 4, 4A: quantum absorption spectroscopy system, 11, 12: pump light source, 21, 21A, 21B, 22, 22A, 22B, 23, 23A to 23E, 24, 24A: quantum interferometer, 201: optical fiber, 202: dichroic splitter, 203: optical fiber, 204: photon pair source, 205: optical fiber, 205A: core, 205B: clad, 205C: hole, 206: dichroic splitter, 207: optical fiber (visible SMF), 208: polarization controller, 209: mirror, 210: optical fiber (infrared SMF), 210A, 210E: non-tapered portion, 210B, 210D: tapered portion, 210C: taper waist portion, 211: polarization controller, 212: mirror, 213: sample holder, 213A: absorber, 214 to 219: optical fiber, 220: photon pair source, 221: moving mirror, 31: spectroscope, 301: dispersive optical element, 302: multi-pixel photodetector, 32: single-pixel photodetector, 41, 42: controller, 401: processor, 402: memory, 403: input/output port, 404: monitor, 421: light source control unit, 422: mirror control unit, 423: count rate calculation unit, 424: Fourier transform unit, 425: first storage unit, 426: second storage unit, 427: transmittance calculation unit, 428: absorption spectrum calculation unit, 429: monitor control unit, 50: nonlinear optical crystal, 51: first crystal, 52: second crystal, 60: QPM device, 61: lens, 62: nonlinear optical crystal, 621: first end, 622: second end, 63: long pass filter, 64: lens, 65: sharp cut filter, 70: ATR unit, 71: lens, 72: prism, 73: lens

What is claimed is:

1. A quantum absorption spectroscopy system comprising:
   a pump light source that emits pump light;
   a quantum interferometer that includes a photon pair source that generates a quantum entanglement photon pair of a signal photon and an idler photon and causes quantum interference between a plurality of physical processes in which the quantum entanglement photon pair is generated through spontaneous parametric down-conversion of the pump light, a sample being arranged on a propagation path of the idler photon; and
   a photodetector that detects the signal photon from the quantum interferometer, wherein the quantum interferometer includes:
   a wavelength separation element that separates the quantum entanglement photon pair into the signal photon and the idler photon in accordance with a wavelength; and
   a single mode fiber portion configured to measure the sample using propagation of the idler photon, the single mode fiber portion having a tapered fiber which is (i) optically coupled between the wavelength separation element and at least part of the propagation path of the idler photon and (ii) arranged external to the photon pair source.

2. The quantum absorption spectroscopy system according to claim 1, wherein the tapered fiber comprises:
   a non-tapered portion, and
   a taper waist portion thinner than the non-tapered portion, the taper waist portion having a diameter included in a wavelength range from a visible range to a far-infrared range.

3. The quantum absorption spectroscopy system according to claim 1, wherein the tapered fiber is replaceable.

4. The quantum absorption spectroscopy system according to claim 1, wherein the quantum interferometer further includes:
a first mirror that reflects the idler photon, and
a second mirror that reflects the signal photon,
the first single mode fiber is optically coupled between the wavelength separation element and the first mirror,
the single mode fiber portion further includes a second single mode fiber that is optically coupled between the wavelength separation element and the second mirror and propagates light in a wavelength range of the signal photon, and
at least one of the first and second single mode fibers is a polarization maintaining fiber.

5. The quantum absorption spectroscopy system according to claim 1, wherein
the single mode fiber portion further includes a wideband single mode fiber that is optically coupled between the photon pair source and the wavelength separation element and propagates light in all wavelength ranges of the pump light, the signal photon, and the idler photon.

6. The quantum absorption spectroscopy system according to claim 5, wherein the wideband single mode fiber is a photonic crystal fiber.

7. The quantum absorption spectroscopy system according to claim 1, wherein
the single mode fiber portion includes a wideband single mode fiber that is optically coupled between the photon pair source and the wavelength separation element and propagates light in all wavelength ranges of the pump light, the signal photon, and the idler photon.

8. A quantum absorption spectroscopy system comprising:
a pump light source that emits pump light;
a quantum interferometer that causes quantum interference between a plurality of physical processes in which a quantum entanglement photon pair of a signal photon and an idler photon is generated through spontaneous parametric down-conversion of the pump light, a sample being arranged on a propagation path of the idler photon; and
a photodetector that detects the signal photon from the quantum interferometer, wherein
the quantum interferometer includes a single mode fiber portion optically coupled to at least part of a propagation path of the signal photon and the propagation path of the idler photon, wherein
the pump light source is a pulsed light source,
the photodetector is a single-pixel photodetector, and
the single mode fiber portion includes a wavelength dispersion single mode fiber optically coupled to the single-pixel photodetector.

9. The quantum absorption spectroscopy system according to claim 8, wherein
the quantum interferometer is used in a high gain region in which a signal intensity of the single-pixel photodetector increases non-linearly as transmittance of the idler photon for the sample rises, and
the single mode fiber portion further includes an absorber that absorbs the idler photon.

10. The quantum absorption spectroscopy system according to claim 1, further comprising a processor that executes arithmetic processing for analyzing an absorption spectroscopy characteristic of the sample, wherein
the quantum interferometer further includes a phase converter that changes a phase of one of the signal photon and the idler photon,
the photodetector outputs a quantum interference signal in accordance with the number of the signal photons detected in a case where the phase of the one of the signal photon and the idler photon is changed by the phase converter, and
the processor calculates the absorption spectroscopy characteristic of the sample by Fourier transform on the quantum interference signal.

11. The quantum absorption spectroscopy system according to claim 10, wherein the processor
calculates a Fourier spectrum by Fourier transform on the quantum interference signal in a state where the sample is arranged on the propagation path of the idler photon, and further calculates a reference Fourier spectrum by Fourier transform on the quantum interference signal in a state where the sample is not arranged on the propagation path of the idler photon, and
calculates a complex transmittance spectrum of the sample based on a ratio between the Fourier spectrum and the reference Fourier spectrum.

12. The quantum absorption spectroscopy system according to claim 11, wherein the processor calculates an absorption spectrum of the sample by squaring an absolute value of the complex transmittance spectrum of the sample.

13. The quantum absorption spectroscopy system according to claim 1, wherein
the quantum interferometer generates a visible photon as the signal photon, and
the photodetector is a silicon-based photodetector.

14. A quantum absorption spectroscopy system comprising:
a pump light source that emits pump light;
a pump light source that emits pump light;
a quantum interferometer that includes a photon pair source that generates a quantum entanglement photon pair of a signal photon and an idler photon and causes quantum interference between a plurality of physical processes in which the quantum entanglement photon pair is generated through spontaneous parametric down-conversion of the pump light, a sample being arranged on a propagation path of the idler photon; and
a photodetector that detects the signal photon from the quantum interferometer, wherein
the quantum interferometer includes:
a wavelength separation element that separates the quantum entanglement photon pair into the signal photon and the idler photon in accordance with a wavelength, and
a single mode fiber portion configured to measure the sample, the single mode fiber portion having a tapered fiber which is (i) optically coupled between the wavelength separation element and at least part of the propagation path of the idler photon and (ii) arranged external to the photon pair source, so as to measure the sample, and
the tapered fiber has a non-tapered portion and a taper waist portion thinner than the non-tapered portion and configured to be arranged in a vicinity of the sample so that an evanescent field of the propagation path of the idler photon and the sample interacts with each other.

* * * * *